(12) United States Patent
Schwartz

(10) Patent No.: US 8,353,496 B2
(45) Date of Patent: Jan. 15, 2013

(54) TROPHY ASSEMBLY WITH TWIST CONNECTOR

(75) Inventor: William Schwartz, Land O'Lakes, FL (US)

(73) Assignee: William Steven Schwartz Revocable Trust, Land O'Lakes, FL (US)

( * ) Notice: Subject to any disclaimer, the term of this patent is extended or adjusted under 35 U.S.C. 154(b) by 289 days.

(21) Appl. No.: 12/696,559

(22) Filed: Jan. 29, 2010

(65) Prior Publication Data

US 2010/0129574 A1    May 27, 2010

Related U.S. Application Data

(63) Continuation-in-part of application No. 11/952,630, filed on Dec. 7, 2007, now abandoned.

(60) Provisional application No. 61/148,063, filed on Jan. 29, 2009.

(51) Int. Cl.
*A47B 91/00* (2006.01)
*A47G 35/00* (2006.01)

(52) U.S. Cl. ................... 248/346.03; 248/154; 248/310; 248/349.1; 428/542.4

(58) Field of Classification Search ............... 248/349.1, 248/346.03, 346.04, 222.51, 222.52, 915, 248/310, 313, 154; 40/427, 745, 747, 761, 40/781, 493, 358; 428/542.4, 13, 99, 131, 428/542.2, 542.3, 7, 8, 9, 10, 11
See application file for complete search history.

(56) References Cited

U.S. PATENT DOCUMENTS

| | | | |
|---|---|---|---|
| 2,291,975 A | 8/1942 | Minero | |
| 2,355,922 A | 8/1944 | Minero | |
| 2,649,984 A | 8/1953 | Abt | |
| 2,843,959 A * | 7/1958 | Flauder | 248/349.1 |
| 3,027,670 A | 4/1962 | Kramer et al. | |
| 3,595,727 A | 7/1971 | Allen | |
| 3,720,430 A | 3/1973 | St. Paul | |
| 3,754,724 A * | 8/1973 | Osowski | 248/690 |
| 5,054,733 A * | 10/1991 | Shields | 248/313 |
| 5,088,153 A | 2/1992 | Winder et al. | |
| 5,143,338 A * | 9/1992 | Eberlin | 248/313 |
| 5,322,739 A * | 6/1994 | Stagl | 428/542.4 |
| 5,834,073 A | 11/1998 | Greenblat et al. | |
| 5,918,849 A * | 7/1999 | Bliss | 248/523 |

(Continued)

*Primary Examiner* — Tan Le
(74) *Attorney, Agent, or Firm* — Carlton Fields, P.A.; C. Douglas McDonald; William G. Giltinan

(57) ABSTRACT

A trophy assembly having a base with an integral lower clip, a column with interior column ribs, in which the lower clip is adapted to engage the column ribs, thereby joining the base and the column when the column is placed over the clip and rotated. A trophy assembly having a base attached to a lid with an integral clip, and a column with interior column ribs, wherein the clip is adapted to engage the column ribs, thereby joining the base, the lid and the column when the column is placed over the clip and rotated. A trophy column having an exterior column surface and an interior column surface with a plurality of inwardly and longitudinally extending ribs. A plastic base for use in a trophy assembly having a base and a column, wherein the base has in integral clip adapted to engage ribs on the interior surface of the column. A figure for use in a trophy assemble having a column with ribs on the interior column surface wherein the figure has an integral clip adapted to engage the ribs. A lid for a trophy assembly that is attachable to a base, figure or platform, in which the lid has an integral clip adapted to engage the column ribs.

18 Claims, 24 Drawing Sheets

U.S. PATENT DOCUMENTS

| | | |
|---|---|---|
| 6,042,904 A | 3/2000 | Greenblat et al. |
| 6,060,171 A | 5/2000 | Greenblat et al. |
| 6,828,034 B2 | 12/2004 | Banman |
| 7,001,668 B2 | 2/2006 | Banman |
| 7,572,520 B2 | 8/2009 | Surber |
| 7,748,091 B2 * | 7/2010 | Bogh-Sorensen ......... 24/573.11 |
| 2001/0000617 A1 * | 5/2001 | Tracy ............................ 248/154 |
| 2003/0208939 A1 | 11/2003 | Banman, Jr. |
| 2004/0191554 A1 * | 9/2004 | Banman ...................... 428/542.4 |
| 2010/0129574 A1 * | 5/2010 | Schwartz ................. 248/346.03 |

\* cited by examiner

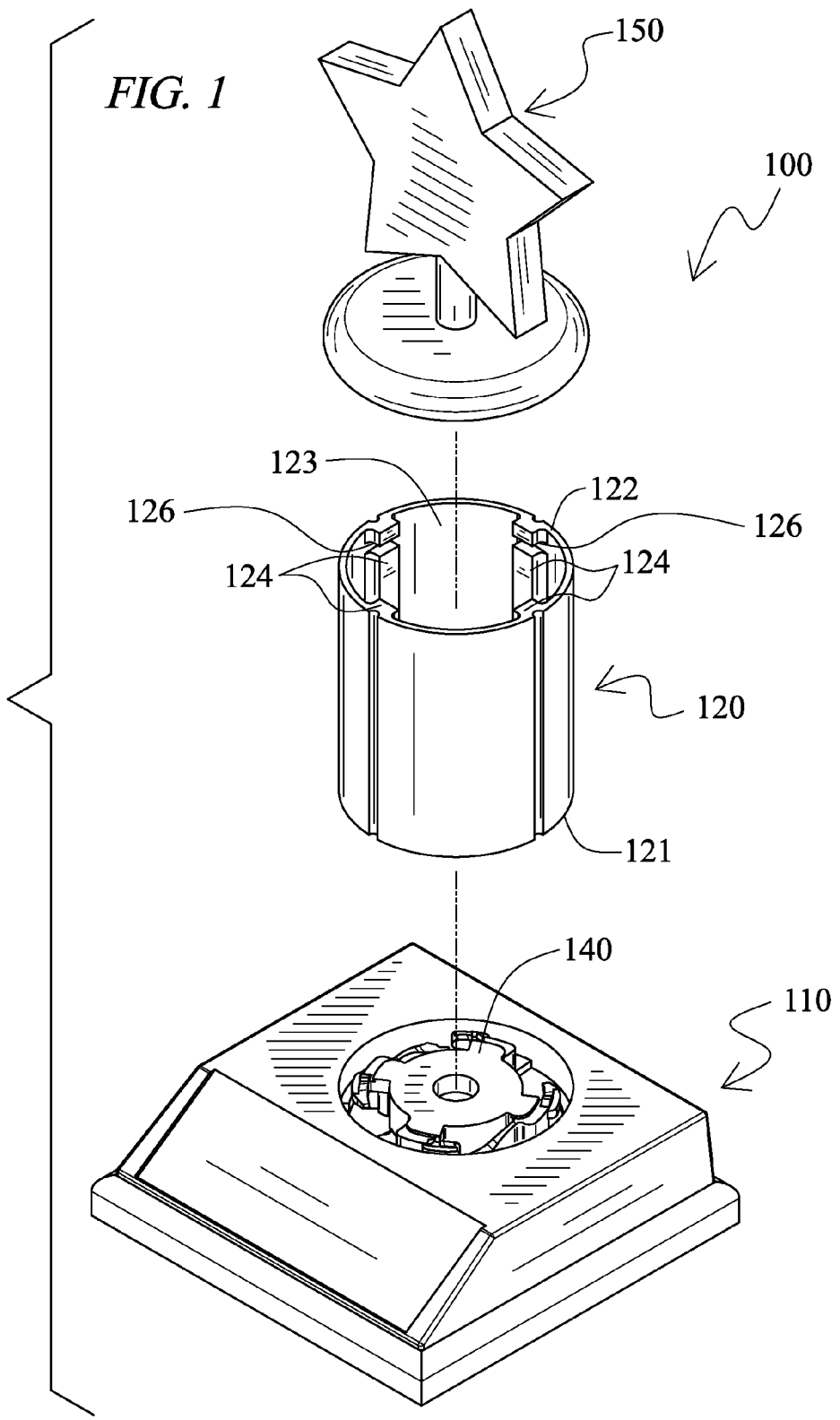

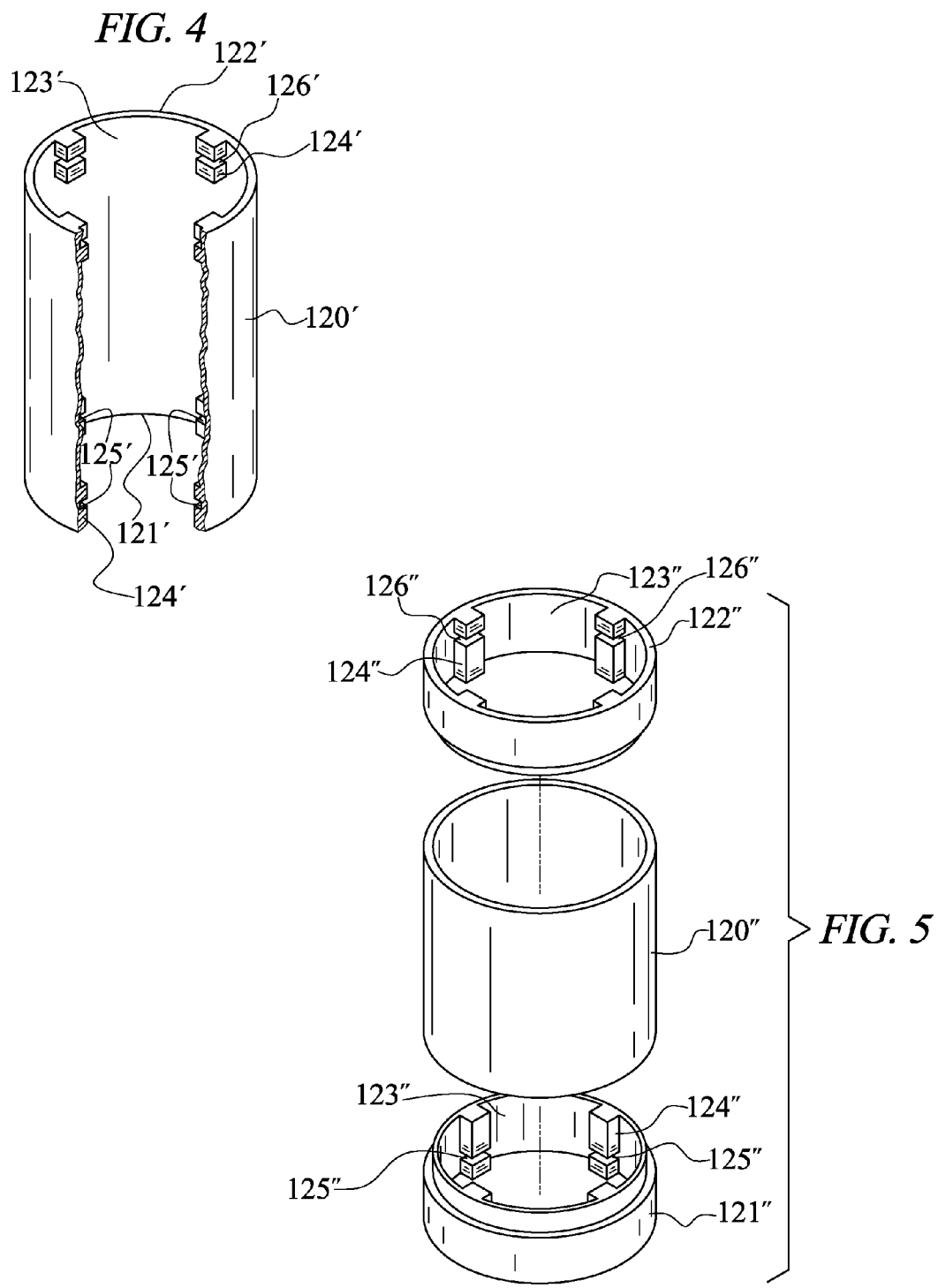

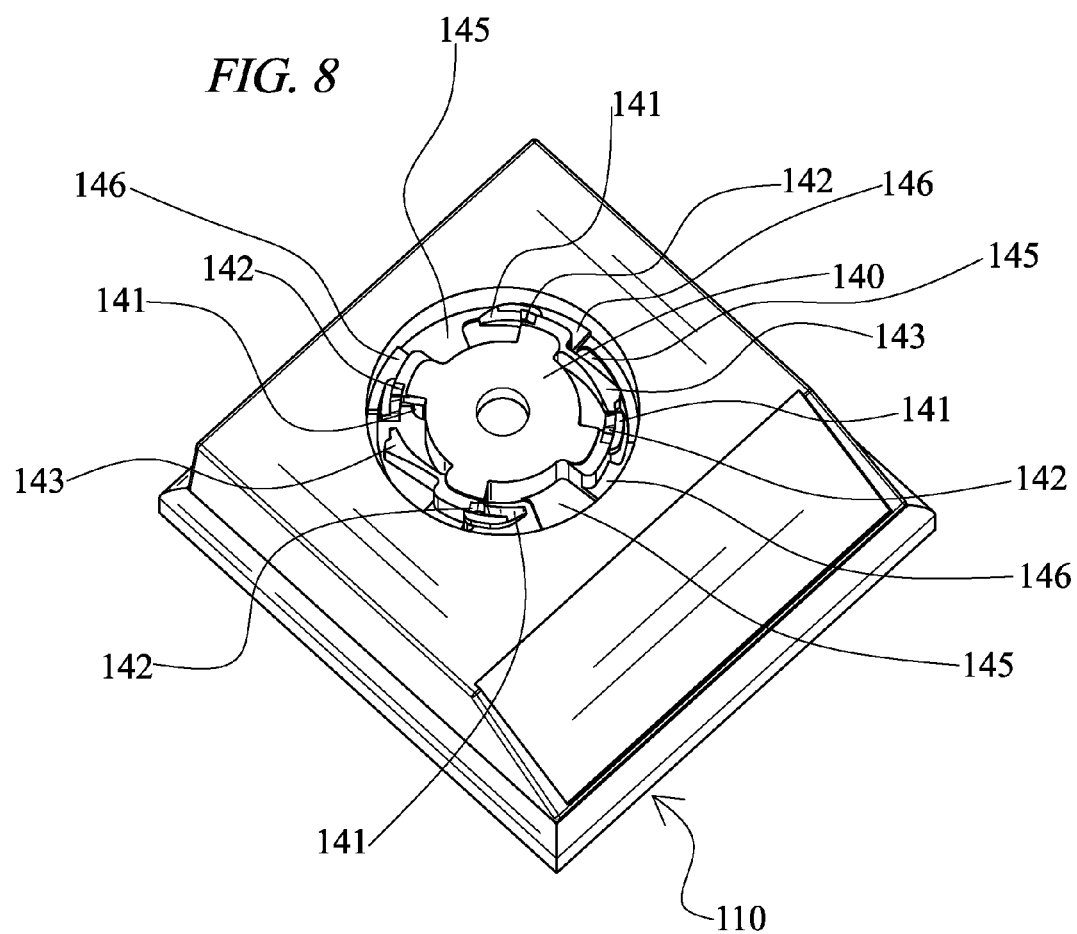

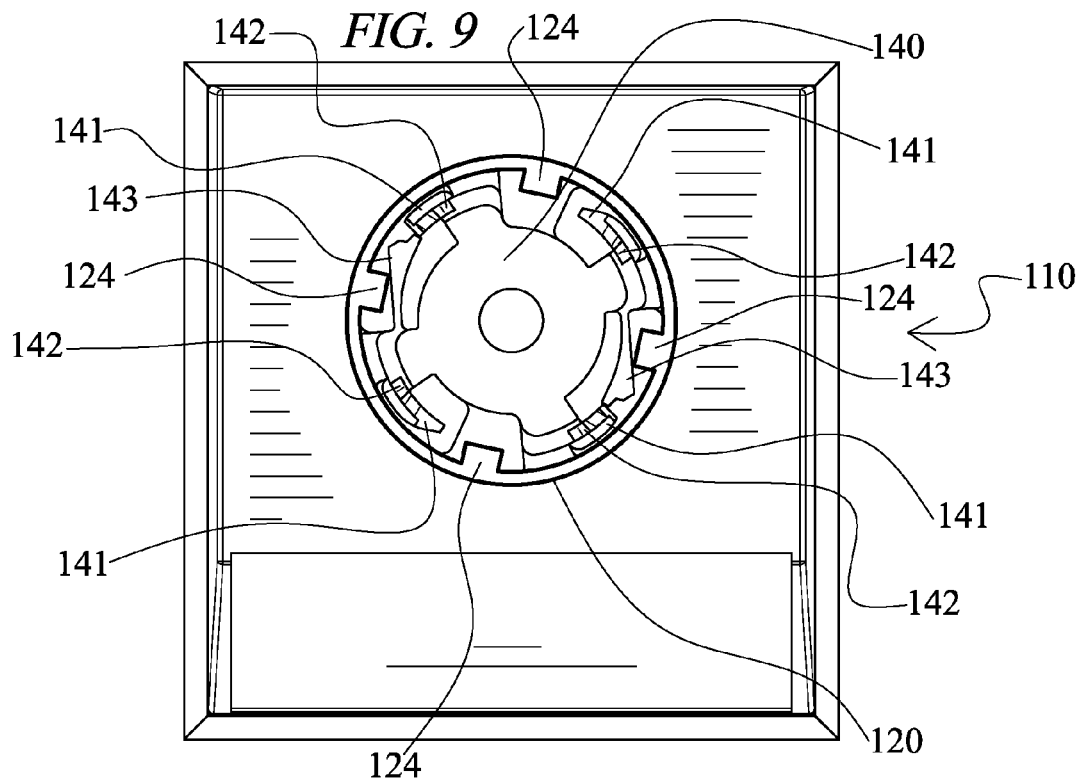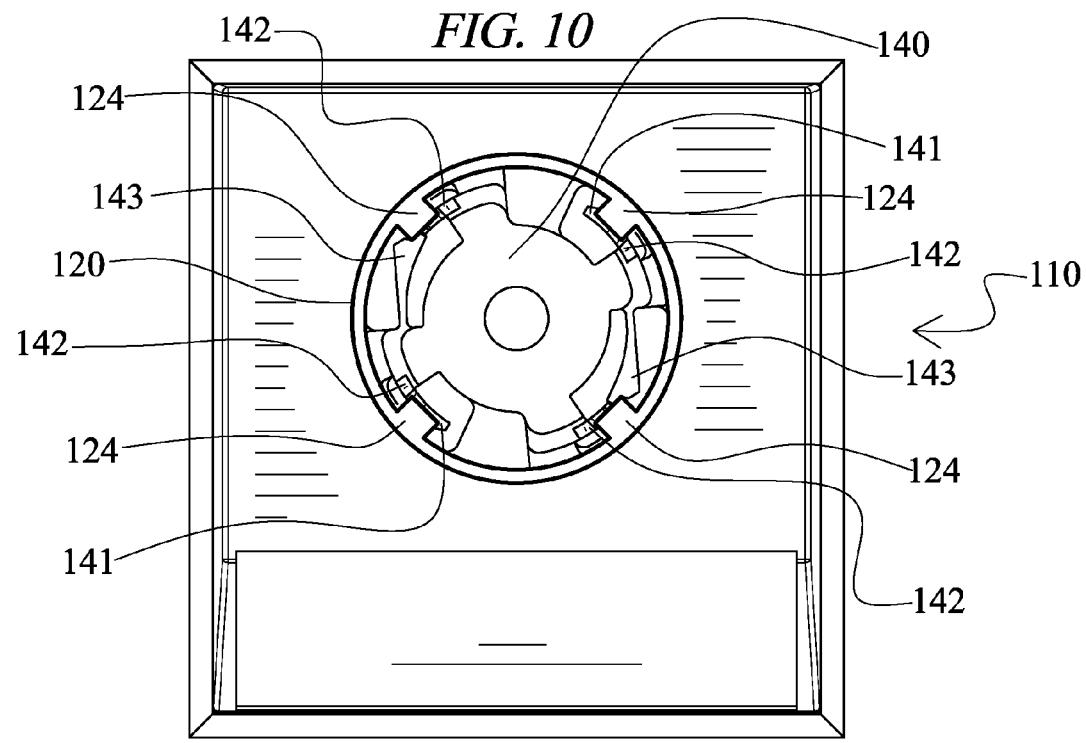

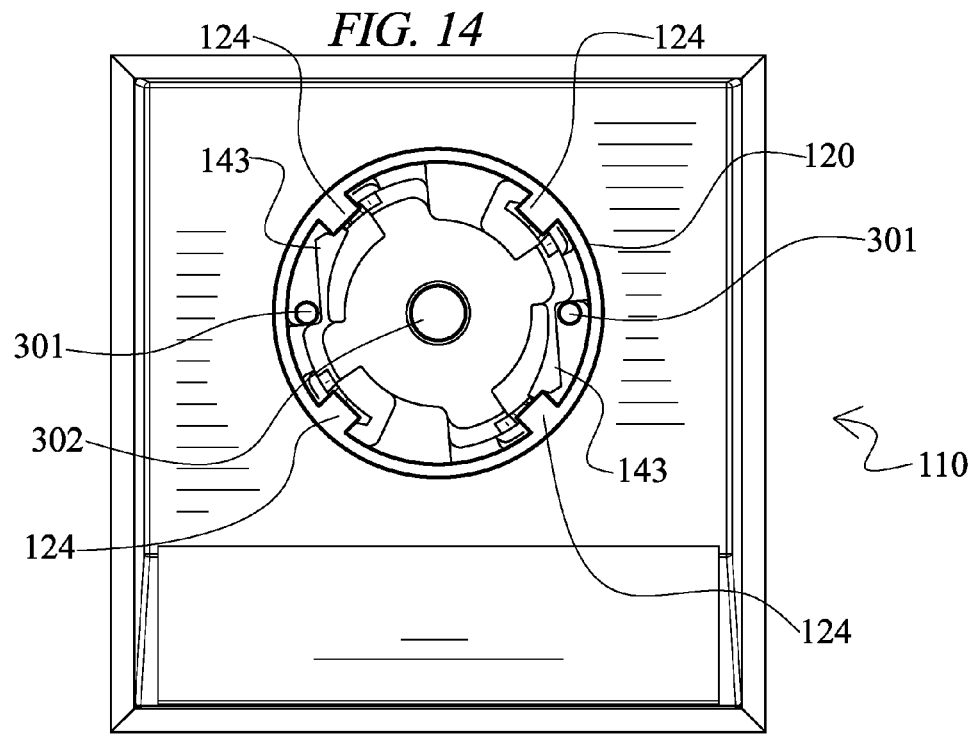
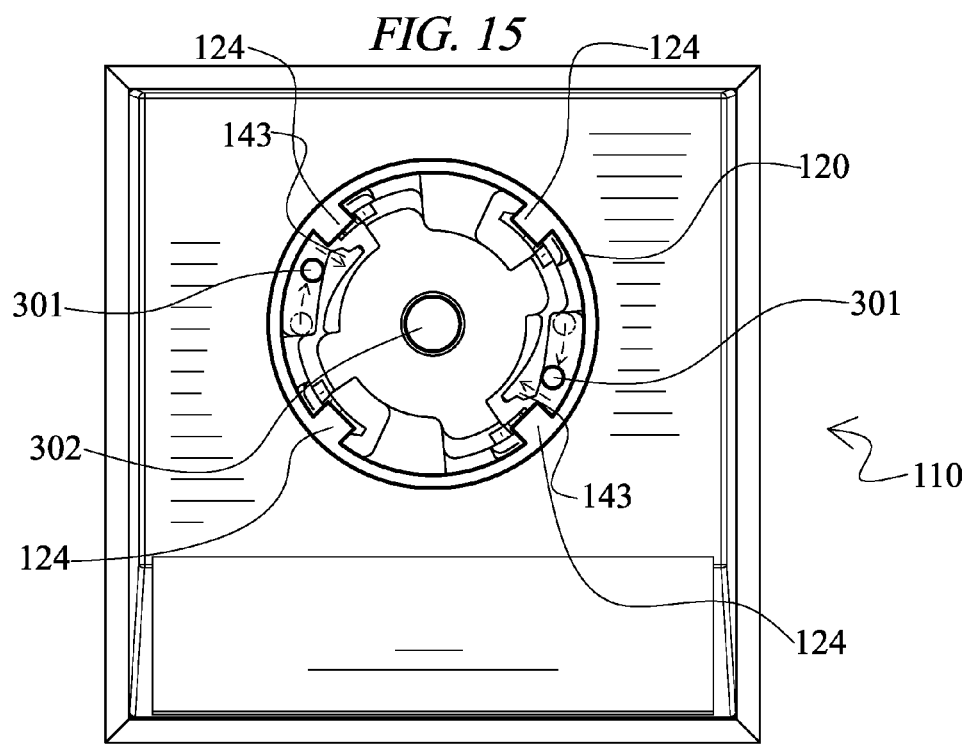

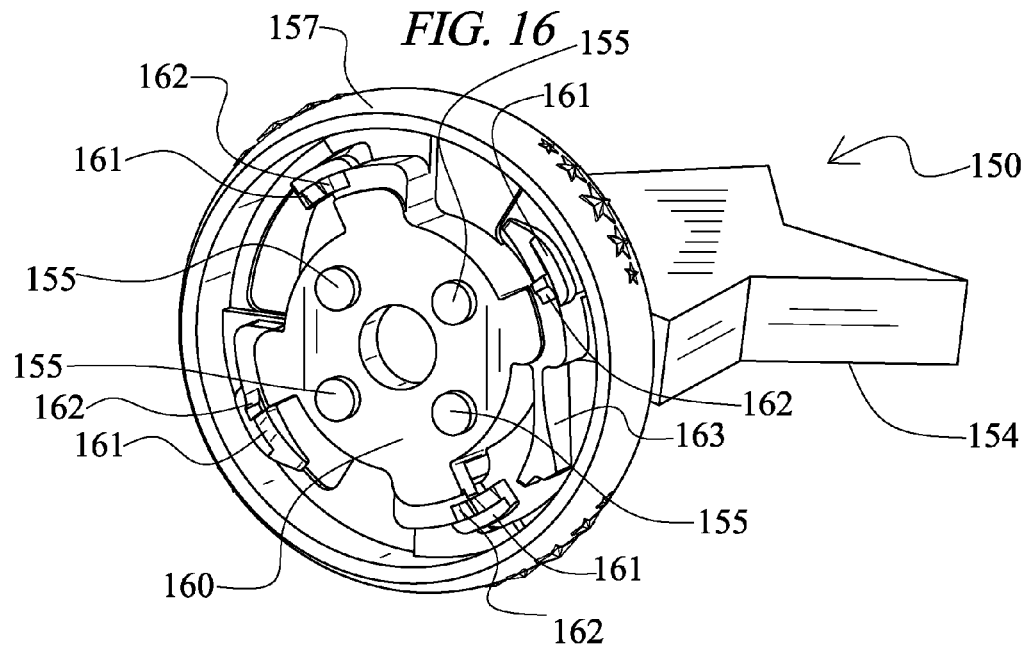
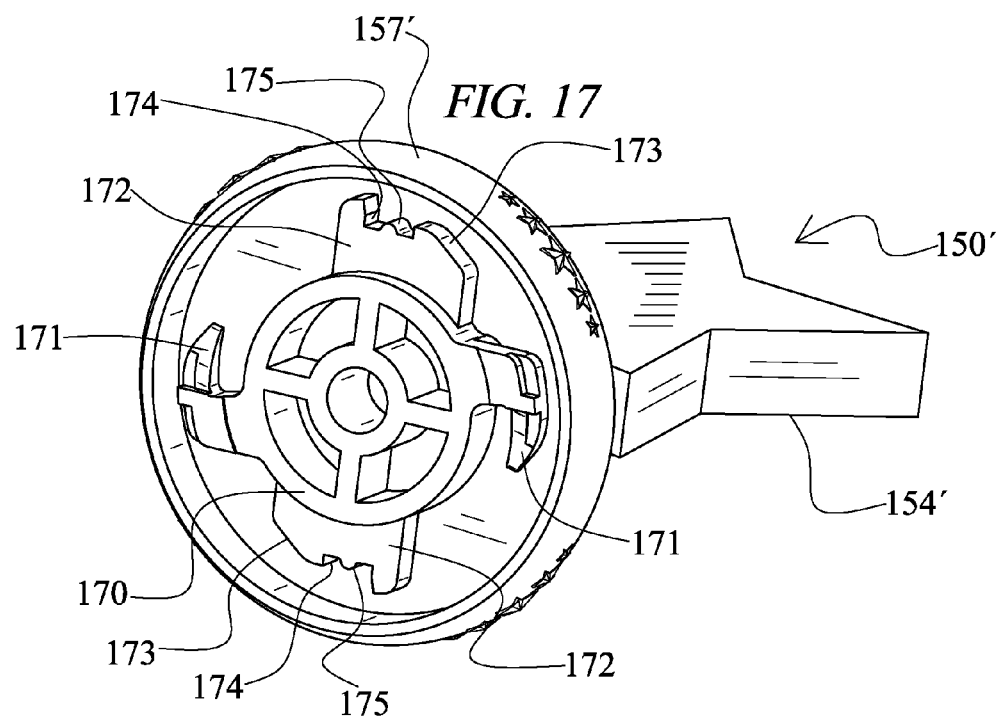

TROPHY ASSEMBLY WITH TWIST CONNECTOR

This application, which claims priority to U.S. Provisional Patent Application Ser. No. 61/148,063, filed Jan. 29, 2009, is a continuation-in-part of U.S. patent application Ser. No. 11/952,630, filed Dec. 12, 2007, the contents of which are herein incorporated by reference in their entirety.

BACKGROUND

This invention relates to trophy assemblies utilizing plastic columns sold by awards dealers and typically used to commemorate sports victories and other achievements.

Typical conventional trophy assemblies comprise a base, a lower lid, a column, an upper lid and a figure symbolic of the achievement. Larger trophy assemblies may comprise additional columns mounted to create multi-level trophies with the figure on the top with other decorative elements elsewhere in the assembly. Historically, trophies utilizing columns have been assembled using threaded rods that run through the base, the lower lid, the column, and the upper lid, and then attach to the figure using a coupler. A nut is then used to secure the base to the rod and compress the base, lower lid, column, upper lid, and figure together, thereby creating a rigid assembly.

The conventional threaded rod design has several disadvantages. One disadvantage is that the nut, threaded rod, and coupler (the "hardware") contribute more than 30% of the number of components of a typical small trophy. This impacts the cost and weight of the final assembly, increases inventory and freight expenses, and requires substantial space for inventory. More importantly, assembling even the smallest of such trophies is a labor intensive process, typically requiring many discrete steps, including rotations and alignments of components. Accordingly, the average awards dealer must incur high labor costs, often necessitating the hiring of part time employees and payment for numerous overtime hours, to repeatedly complete this laborious process in order to have a sufficient number of awards ready in time for ceremonies during peak season. These disadvantages arise primarily from the structural design being based on threaded rods and compression for structural rigidity.

It is an object of the present invention to provide a trophy assembly requiring fewer components that can be assembled quickly and easily by using a column design that enables the column itself to become a structural element that holds the assembly together, thereby eliminating the need for the threaded rods and associated hardware. It is a further object of this invention to provide a trophy assembly that enables the columns, figures, platforms and lids of present invention to be combined with existing bases, figures and platforms in order to allow the use of existing inventories of figures, bases, and platforms with the structural column of the present invention. Finally, it is an object of the present invention to provide a trophy base, a trophy column, a trophy figure, a trophy platform, and trophy lids, suitable for use in the trophy assemblies of the present invention. Other objects and advantages of the present invention are made clear to those skilled in the art by the following description of the presently preferred embodiments thereof.

SUMMARY

In accordance with the present invention, there is provided a trophy assembly having a base, at least one column, and at least one lower clip integral to the base. The column has a first column end and a second column end, and an interior column surface with a plurality of inwardly and longitudinally extending ribs. The interior column surface is dimensioned and configured to fit over the lower clip, and the lower clip is configured and dimensioned to engage at least one of the ribs when the column is placed over the lower clip and rotated, thereby joining the column and the base.

There is also provided, in accordance with the present invention, a trophy assembly having a base, at least one column, and at least one lower clip integral to the base. The column has a first column end and an opposed second column end, and an interior column surface comprising a plurality of inwardly and longitudinally extending ribs, and being configured and dimensioned to fit over the lower clip. The lower clip has at least two lower tabs, at least one lower stop and at least one lower spring clip. The ribs each have a lower slot that is generally close to the first end of the column, and is configured and dimensioned such that the lower tabs will engage the lower slots then the first column end is placed over the lower clip and the column is rotated. The lower stop is configured and dimensioned to engage at least one of the ribs substantially upon the lower tabs engaging the lower slots. The lower spring clip is configured and dimensioned such that, upon rotation of the column, the lower spring clip is initially deflected by at least one of the ribs, and then released substantially upon the lower tabs engaging the lower slots. In this way, the lower stops resist over-rotation of the column once the lower tabs are engaged, the lower spring clip(s) resist reverse rotation, and the column and base are joined.

Also provided in accordance with the present invention is a trophy assembly having a base, at least one lower lid, and at least one column. The lower lid is attached to the base and has an integral lower clip. The column has a first column end and an opposed second column end, and an interior column surface with a plurality of inwardly and longitudinally extending ribs. The interior column surface is configured and dimensioned to fit over the lower clip, and the lower clip is configured and dimensioned to engage at least one of the ribs when the first column end is placed over the lower clip and the column is rotated, whereby the base, lower lid and column are joined.

Further provided in accordance with the present invention is a trophy assembly with a base, at least one lower lid, and at least one column. The lower lid has an integral lower clip and is attached to the base. The column has a first column end and an opposed second column end, and an interior column surface comprising a plurality of inwardly and longitudinally extending ribs. The interior column surface is configured and dimensioned to fit over the lower clip, which has at least two lower tabs, at least one lower stop, and at least one lower spring clip. At least two of the ribs have a lower slot close to the first column end. The lower slots are configured and dimensioned such that the lower tabs engage the lower slots when the first column end is placed over the lower clip and the column is rotated. The lower stop is configured and dimensioned to engage at least one of said ribs substantially upon said lower tabs engaging said lower slots. The lower spring clip is configured and dimensioned such that, upon rotation of the column, the lower spring clip is deflected by at least one of the ribs, and is released substantially upon the lower tabs engaging the lower slots. In this way, the base, lower lid and column are joined, the lower stop resists over-rotation and the lower spring clip resists reverse rotation.

Still further provided in accordance with the present invention is an extruded plastic column for use in a trophy assembly. The column has an exterior column surface and an interior column surface. The interior column surface has a plurality of inwardly and longitudinally extending ribs extending substantially toward the center of said column.

Also provided in accordance with the present invention is a plastic base for use in a trophy assembly in which the trophy assembly has at least one column with a first column end and an opposed second column end, and an interior column surface. The interior column surface has at least two inwardly and longitudinally extending ribs, each such rib having a slot close to the first column end. The base further has a clip with at least two tabs, at least one stop, and at least one spring clip. The tabs are configured and dimensioned such that they engage the lower slots when the first column end is placed over the clip and rotated. The stop is configured and dimensioned to engage at least one of the ribs substantially upon the tabs engaging the lower slots, and the spring clip is configured and dimensioned such that, upon rotation of the column, the spring clip is deflected by at least one of the ribs, and is released substantially upon engagement of the tabs with the lower slots. In this way, the base and column are joined, the stop resists over-rotation, and released spring clip resists reverse rotation.

Further provided in accordance with the present invention is a figure for use in a trophy assembly, in which the trophy assembly has at least one column or column stub. The column has a first column end and an opposed second column end, and an interior column surface with at least two inwardly and longitudinally extending ribs, each of which has a slot close to the second column end. The figure has an integral clip and an overlapping lip. The clip is configured and dimensioned to engage at least one of the ribs when the figure is placed over said second column end and rotated, and the lip is configured and dimensioned to extend over said second column end. In this way, the column and figure are joined and the lip covers a portion of said exterior column surface close to the second column end.

Also provided in accordance with the present invention is a lid for use in a trophy assembly in which the trophy assembly has at least one column. The column has an exterior column surface and an interior column surface with a plurality of inwardly and longitudinally extending ribs. The interior column surface is configured and dimensioned to fit into the lid. The lid comprises a means of attaching the lid to a base or figure, and an overlapping lip configured and dimensioned to extend over a portion of said exterior column surface when the column is placed into the lid. The lid further comprises an integral clip configured and dimensioned to engage at least one of the ribs when the column is placed over the clip and said column or the lid is rotated. The engagement of the clip with the ribs serves to join the column and the lid, with the lip covering a portion of the exterior column surface close to the column end.

BRIEF DESCRIPTION OF THE DRAWINGS

Other features in the invention will become apparent from the attached drawings, which illustrate certain preferred embodiments of the trophy assembly and method of this invention, wherein FIG. 1 is an exploded, perspective view of an embodiment of the trophy assembly of the present invention having a base with integral lower clip, a column, and a figure with integral upper clip;

FIG. 4 is a perspective, cut-away view of an embodiment of the trophy column of the present invention;

FIG. 5 is an exploded, perspective view of an embodiment of the trophy column of the present invention;

FIG. 8 is a perspective view of an embodiment of the trophy base the present invention, having an integral lower clip;

FIG. 9 is a plan view of the trophy base embodiment illustrated in FIG. 8, illustrating the pre-engagement position of the ribs of the trophy column embodiment illustrated in FIG. 2 with respect to elements of an embodiment of the lower clip of the present invention;

FIG. 10 is a plan view of the trophy base illustrated in FIG. 8, illustrating the post-engagement position of the ribs of the trophy column embodiment illustrated in FIG. 2 with respect to elements of an embodiment of the lower clip of the present invention;

FIG. 14 is a plan view of the trophy base illustrated in FIG. 8 with the lower clip engaging the ribs of the column embodiment illustrated in FIG. 2, illustrating the pre-engagement position of the prongs of an embodiment of the release tool of the present invention with respect to the lower spring clips of an embodiment of the lower clip of the trophy base;

FIG. 15 is a plan view of the trophy base illustrated in FIG. 8 with the lower clip engaging the ribs of the column embodiment illustrated in FIG. 2, illustrating the post-engagement position of the prongs of an embodiment of the release tool of the present invention with respect to the lower spring clips of an embodiment of the lower clip of the trophy base;

FIG. 16 is a perspective view an embodiment of the trophy figure of the present invention having an integral upper clip with a spring clip;

FIG. 17 is a perspective view an embodiment of the trophy figure of the present invention having an integral upper clip with deflectors;

DESCRIPTION OF PREFERRED EMBODIMENTS

Figure 3:
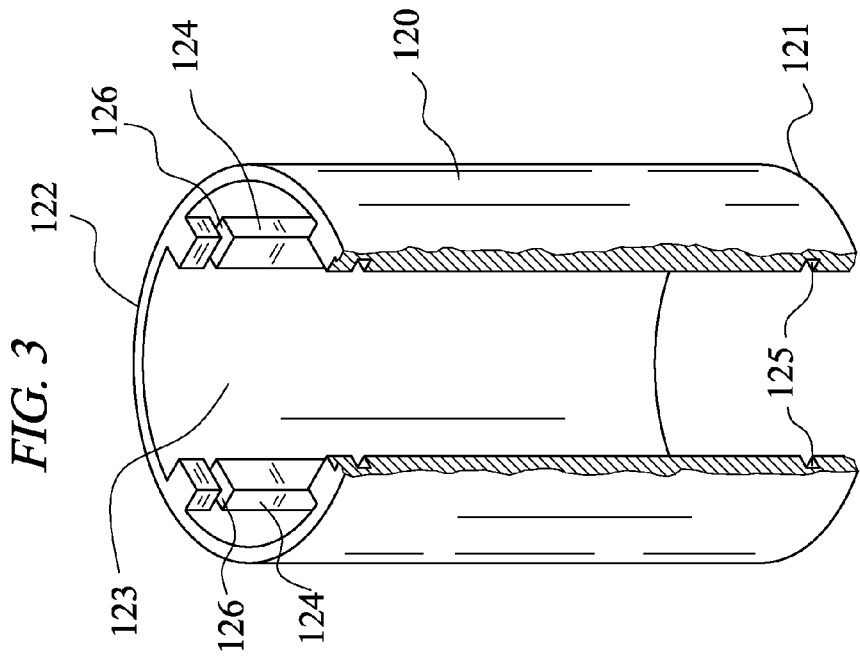
FIG. 3 is a cut-away view of the trophy column embodiment illustrated in FIG. 2.
Figure 2:
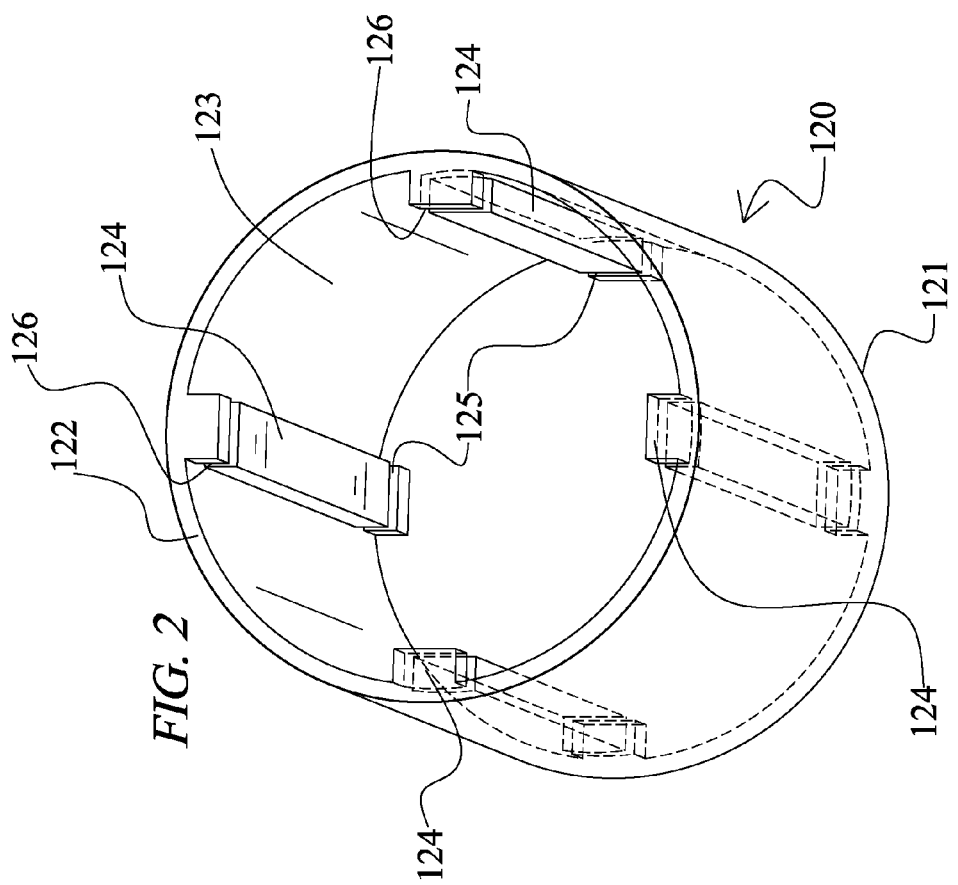
FIG. 2 is a perspective view of an embodiment of the trophy column of the present invention.

In this specification, "adapted" shall mean configured, dimensioned, arranged, and oriented as appropriate. It shall also be understood that, while preferred embodiments are described herein, such embodiments are illustrative only, and the present invention is not limited to those embodiments.

The interlock system for trophy assembly disclosed herein has several advantages over traditional threaded-rod designs. Those advantages include, but are not limited to, reducing the number of parts that trophy dealers must maintain in inventory, faster assembly times, and lower component costs. At the same time, the interlock system, trophy assemblies, and trophy components disclosed herein may be used to construct a wide variety of trophy designs and, in some cases, may be combined with certain components originally designed for use in threaded-rod trophies as well. The result is an improved trophy system that reduces costs for trophy dealers while still allowing for creative flexibility in trophy design.

FIGS. 1-34 illustrate preferred embodiments of the trophy assemblies and components of the present invention. FIG. 1 illustrates a preferred embodiment of the trophy assembly 100 of the present invention having base 110 with an integral lower clip 140 and a column 120. Column 120 is preferably an extruded plastic column, which may conveniently be made from styrene or acrylonitrile butadiene styrene (ABS), but which can also be formed from a variety of other plastic and non-plastic materials known to those of ordinary skill in the art, including, without limitation, aluminum and similar metals. Column 120 may be manufactured in a variety of lengths, which may then conveniently be cut to the size needed for a given trophy application. While any convenient column size may be used, columns of between two and 24 inches in length are typical.

Column 120 is generally hollow and has two opposed ends 121, 122 and an inside surface 123. Column 120 is preferably in the form of a generally cylindrical, hollow tube, adapted to fit over clips 140 and 540 (shown in FIG. 25), 160 and 170 (shown in FIGS. 16-17), 190 (shown in FIG. 20), 200 (shown in FIG. 21), 210 (shown in FIG. 19), and 570 (shown in FIG. 27) such that column 120 can be rotated about clips 140, 540, 160, 170, 190, 200, 210, 560, 570. Although not illustrated, it will be understood by those of ordinary skill in the art that column 120 may also conveniently have a cross section that is ellipsoidal, triangular, octagonal, or in many other configurations known in the art.

Referring to FIGS. 2, 3, 6, and 7, column 120 may conveniently be formed of extruded plastic with at least two, and preferably four, continuous, inwardly and longitudinally extending interior ribs 124 running the length of interior surface 123. Ribs 124 may conveniently be evenly spaced around interior column surface 123, but may also be arranged with uneven spacing if so desired. Alternatively, as shown in FIG. 4, column 120' may be formed from extruded or molded plastic having ribs 124' affixed to, i.e., attached or formed on interior surface 123', but only proximate to column ends 121' or 122', but is otherwise substantial identical to column 120. In another alternate configuration, shown in FIG. 5, column 120" may be formed from a central member and inserts 121" and 122" adapted to fit either partially or entirely (not shown) within column 120", thereby allowing for creation of column members of any convenient length, without requiring ribs running the entire length of the column. In such a configuration, inserts 121" and 122" may conveniently have ribs 124" formed on, or attached to, their inside surface, and may conveniently be attached to a central member via adhesive, friction, or any of a variety of other methods known in the art. It will also be apparent to practitioners of ordinary skill in the art that ribs 124 may be formed via a variety of methods including extrusion, adhesive attachment, forming indentations in the outer surface of columns 120 or inserts 121", 122", removing material from interior surface 123, and other methods known in the art, and that ribs 124 may be of a wide variety of shapes including without limitation substantially rectangular (as shown), semicircular (not shown), trapezoidal (not shown), or made up of a plurality of individual protrusions (not shown). Ribs 124 may be of any convenient size and configuration suitable to engage lower clips 140 and 540, and upper clips 160, 170, 190, 200, 210, 560, 570. Herein, each time column 120 is referenced, it is understood that embodiments of any of columns 120, 120' and 120" may be utilized.

Figure 6:
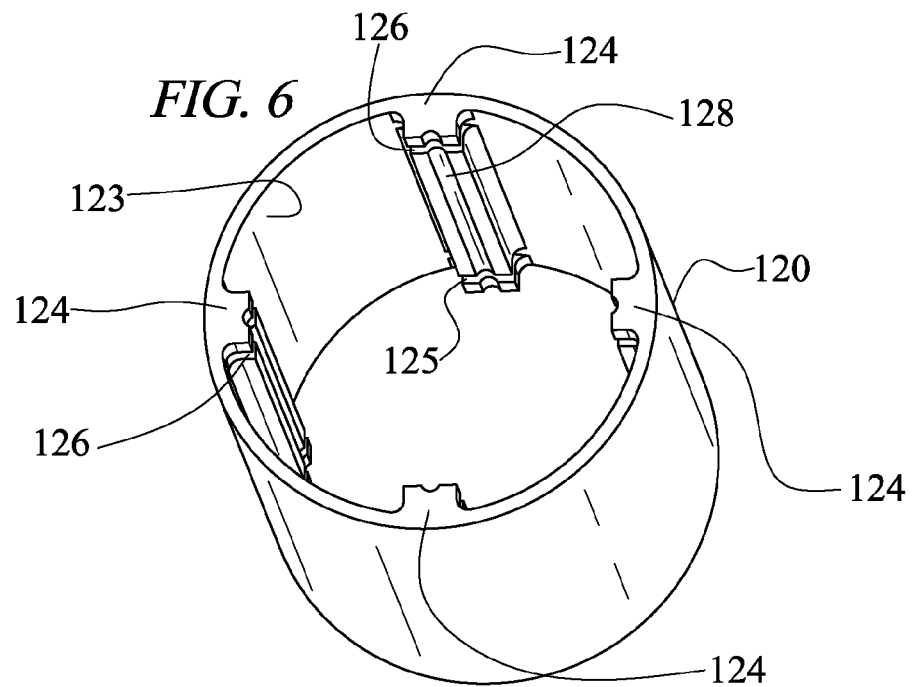
FIG. 6 is a perspective view of the trophy column embodiment of FIG. 2, further comprising optional grooves on the interior ribs.
Figure 7:
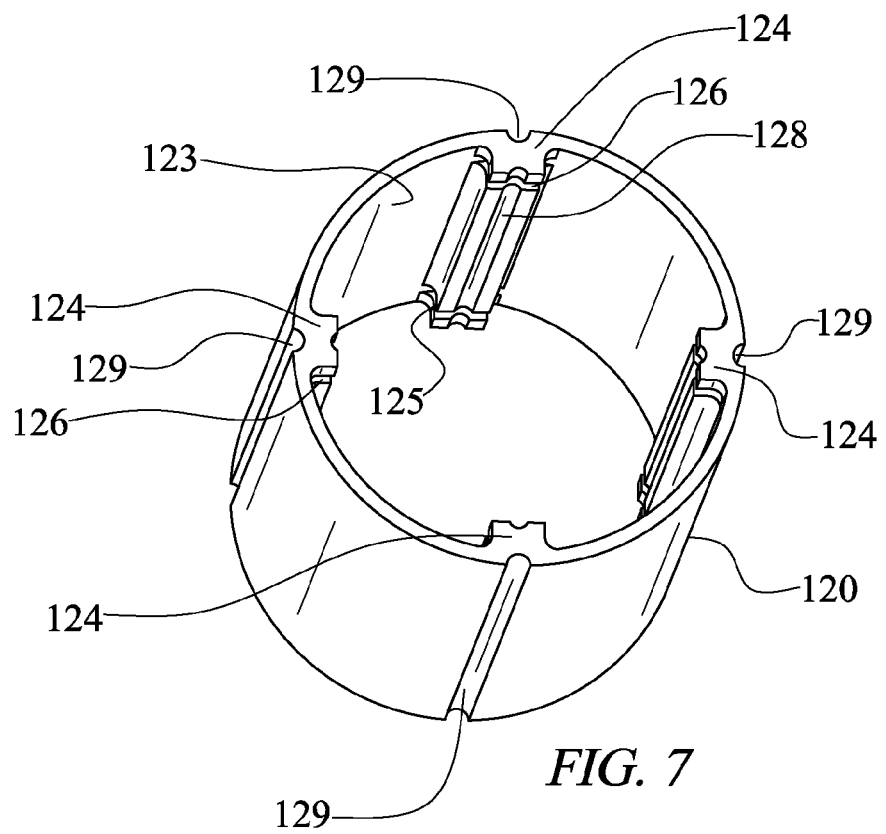
FIG. 7 is a perspective view of the trophy column embodiment of FIG. 6, further comprising optional exterior grooves.

Referring to FIGS. 6 and 7, column 120 may further comprise optional interior and exterior grooves, as are further described later in this specification. Optional interior grooves 128 preferably extend for the length of ribs 124, and may conveniently be substantially centered on the ribs' 124 interior facing surfaces. Optional exterior grooves 129 similarly preferably extend for the length of column 120 and are arranged about the exterior surface of the column. Exterior grooves 129 are preferably formed during an extruding process, but may be formed in other ways known to those of skill in the art.

Referring again to FIG. 1, base 110 has lower clip 140 integral to the top side of base 110. Base 110 may be of any convenient size and shape as may be desirable for a trophy base, and is preferably formed of ABS or similar molded plastic, with lower clip 140 either formed in the molding process or later attached via adhesive, plastic welding, or other techniques known in the art, such that it becomes an integral part of base 110. In embodiments in which lower clip 140 is attached to base 110, base 110 may conveniently comprise one or more posts (not shown) adapted to fit into mating voids (not shown) in separately molded lower clip 140.

Referring now to FIGS. 8-10, in a preferred embodiment, lower clip 140 comprises at least two lower tabs 141, at least one stop 142, and at least one spring clip 143. Ribs 124 have lower slots 125 (shown on FIGS. 2-7) running substantially perpendicular to the direction of ribs 124, generally proximal to first end 121 (also shown in FIGS. 2-7, and adapted such that lower tabs 141 engage slots 125 when column 120 is placed over lower clip 140 and rotated. Lower tabs 141 are conveniently thinner at their leading tip than at their base, resulting in an increasingly tighter engagement as column 120 is rotated. Preferably, upon engagement of lower tabs 141 into lower slots 125, lower end 121 will rest against base 110, thereby allowing base 110 to support column 120 while lower tabs 141 and slots 125 resist separation of base 110 from column 120. In a preferred embodiment, lower clip 140 has four generally evenly spaced lower tabs 141, which each engage slots 125 in four ribs 124, thereby providing support at four locations around interior column surface 123. It will be readily understood by those of ordinary skill in the art that slots 125 and lower tabs 141 need not be perpendicular to ribs 124, and may be angled such that rotation of column 120 urges lower end 121 more tightly against base 110.

Lower clip 140 also has at least one lower stop 142. Preferably, there will be one lower stop 142 on each lower tab 141, but it is not required that more than one lower stop 142 be included, or that lower stop 142 be on lower tab 141. Instead, it is also possible that lower stop 142 may be elsewhere on base 110, or a different part of lower clip 140. Regardless of location, lower stop 142 is adapted to engage at least one of ribs 124 substantially upon lower tabs 141 fully engaging lower slots 125, thereby resisting over-rotation of column 120 and providing an indication of when lower tabs 141 are fully engaged.

The preferred embodiment of lower clip 140 illustrated in FIGS. 8-10 also has at least one spring clip 143 (sometimes referred to an a lower spring clip). As is shown in FIG. 9, which shows column 120 prior to rotation, and FIG. 10, which shows column 120 after rotation, spring clip 143 is preferably adapted such that, upon rotation of column 120 with respect to lower clip 140, spring clip 143 is deflected by rib 124 substantially until lower tabs 141 engage lower slots 125. Upon substantial engagement, spring clip 143 is released.

After release, spring clip 143 resists reverse rotation of column 120. In this way, once lower tabs 141 substantially engage lower slots 125, lower stops 142 resists over-rotation, and spring clip 143 resist reverse rotation, thereby locking column 120 into place and joining base 110 with column 120.

In the preferred embodiment shown in FIGS. 8-10, two spring clips 143 are molded such that they attach to lower clip 140 proximate to the attachment point of two of lower tabs 141, and extend slightly outward from the center point of lower clip 140. To provide additional engagement surface, spring clips 143 may also conveniently be thicker at their outer end than at their attachment point, but do not necessarily need to be. Nor do spring clips 143 necessarily need to be adapted to be deflected inward. Instead, spring clips 143 could be adapted to be deflected downward or upward instead (not shown), either by lower slots 125, or by the bottom of ribs 124. However, as is described below, configuring spring clips 143 to be deflected inward is preferred, as it allows for the use of a release tool 300 (shown in FIG. 11-12) or 300' (shown in FIG. 13) to retract spring clips 143 so that column 120 may be counter-rotated to release column 120 from base 110.

Figure 11:
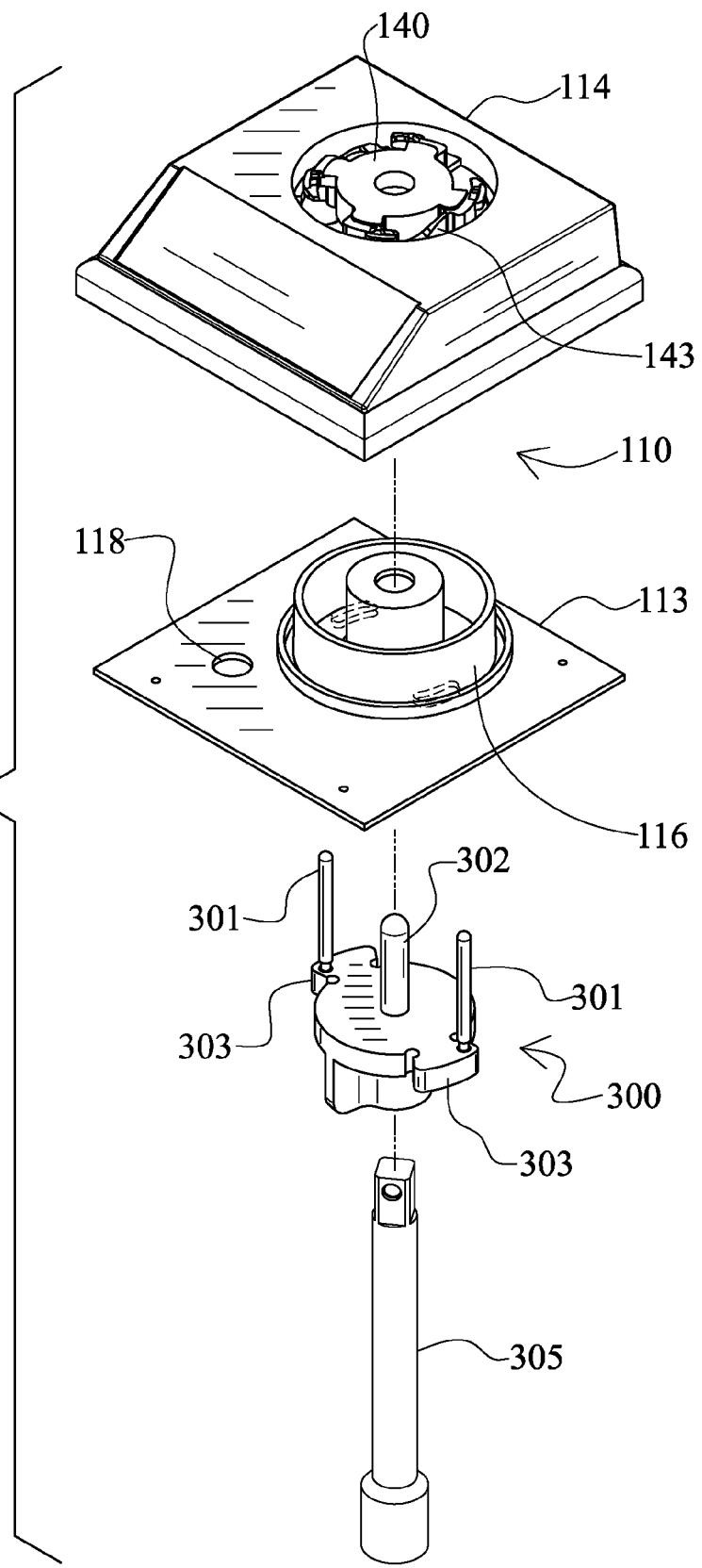
FIG. 11 is an exploded, perspective view of an embodiment of a trophy base of the present invention having a top base side and a bottom base side, and also illustrating an embodiment of the release tool of the present invention adapted to release the lower clip embodiment illustrated in FIGS. 9 and 10.
Figure 12:
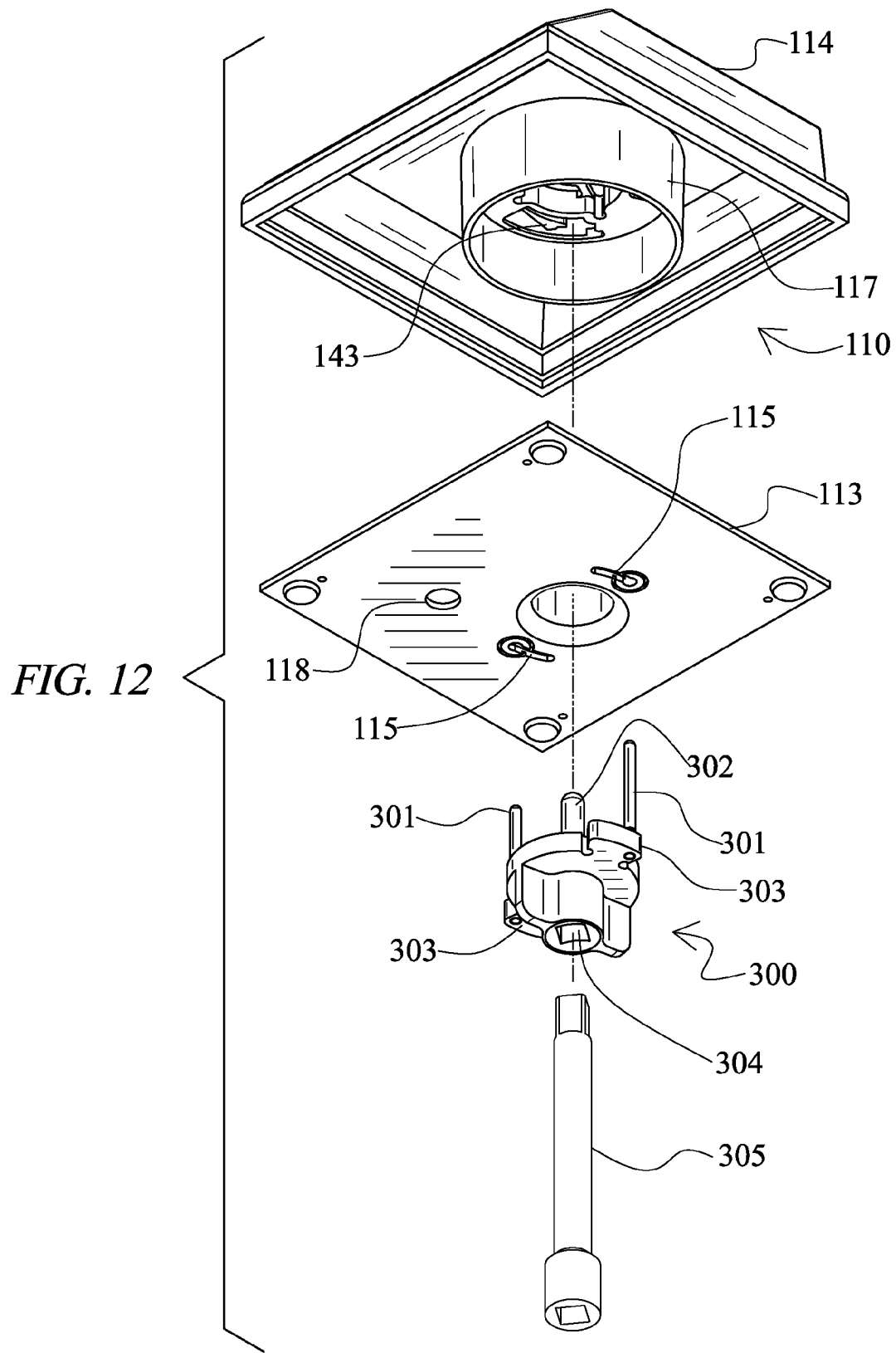
FIG. 12 is an exploded, perspective view of an embodiment of a trophy base of the present invention having a top base side and a bottom base side, and also illustrating an embodiment of the release tool of the present invention adapted to release the lower clip embodiment illustrated in FIGS. 9 and 10.
Figure 13:
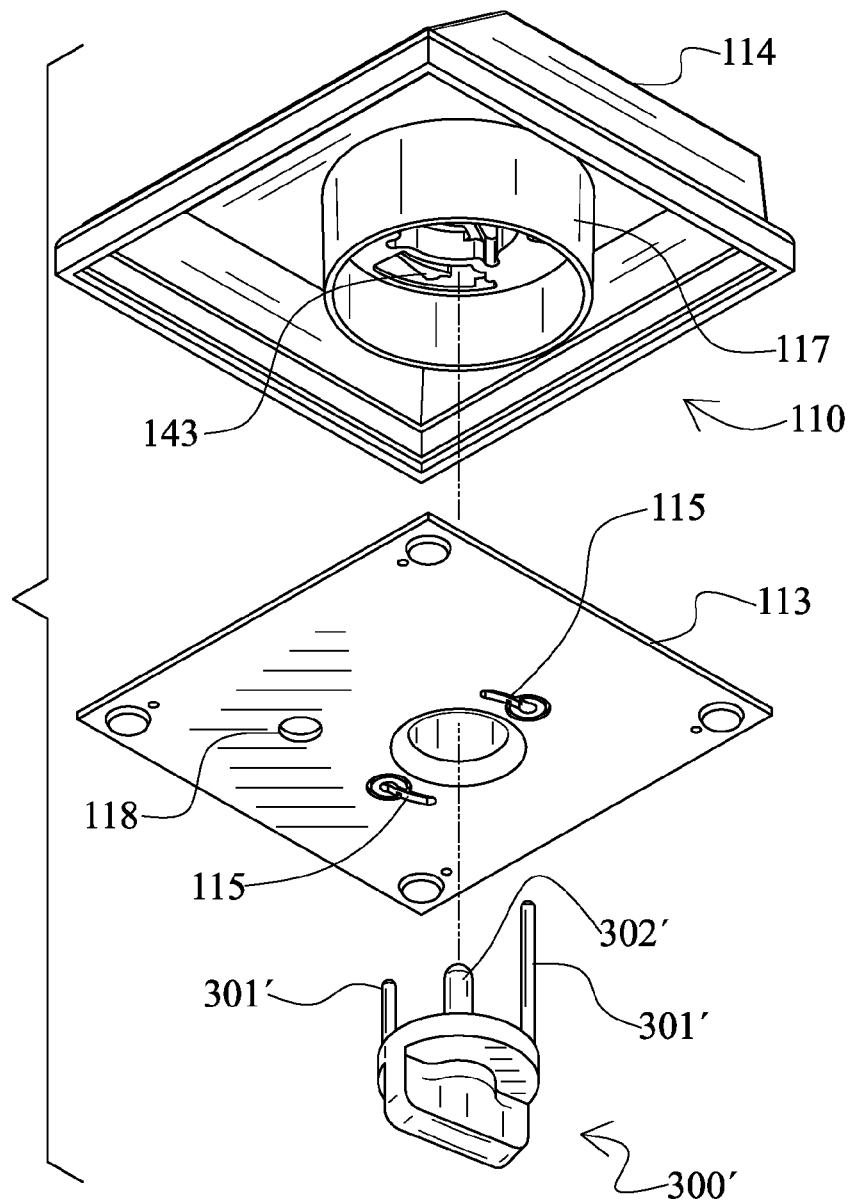
FIG. 13 is an exploded, perspective view of an embodiment of a trophy base of the present invention having a top base side and a bottom base side, and also illustrating an embodiment of the release tool of the present invention adapted to release the lower clip embodiment illustrated in FIGS. 9 and 10.

Referring to FIGS. 11-13, base 110 may conveniently be manufactured in two pieces: a top base side 114 and a bottom base side 113. This is convenient because it allows ballast (not shown), such as plaster of Paris, to be inserted into base 110 upon assembly, thereby making base 110 heavier and more stable and, optionally serving to secure top side 114 and bottom 113 together when it dries. For this purpose, bottom base side 113 may conveniently include a hole 118 for the insertion of ballast (not shown) in an assembled base, and a barrier 116 adapted to prevent the ballast (not shown) from interfering with the operation of lower clip 140 when base top base side 114 is joined to bottom base side 113. Top base side 114 may likewise include a barrier 117 (shown on FIG. 12) to further protect lower clip 140 from ballast (not shown) and to assist in the assembly process by fitting within or without barrier 116 to assist with alignment. When top base side 114 and bottom base side 113 are joined, they may conveniently be held together by the solidification of the ballast (not shown), or by friction, adhesives, clips, mechanical fasteners, or any other of a variety of means known to those of ordinary skill in the art.

Referring to FIGS. 12 and 13, bottom base side 113 may further comprise release slots 115 positioned substantially below spring clips 143 when base 110 is assembled. Release slots 115 are adapted such that upon insertion of prongs 301 of release tool 300 into release slots 115, and rotation of release tool 300, prongs 301 urge spring clips 143 back from ribs 124, as is shown in FIGS. 14-15. In this way, spring clips 143 are released, and column 120 may be separated from base 110 by counter-rotating column 120 until lower tabs 141 exit lower slots 125. Preferably, release slots 115 will include an indication such as an enlarged opening or semicircle or arrow, indicating an appropriate insertion point and direction of rotation.

Referring again to FIG. 11, release tool 300 may be cast from a metal such as aluminum, and may be made easier to use by including optional center post 302 to act as the center of rotation and a fitting 304 to accept a standard socket extension 305, such as a ¼ inch socket extension or a socket driver with a handle commonly used on a screw driver or nut driver (not shown). In this way, release tool 300 may also be used to release spring clips 143 from the top by attaching extensions of sufficient length, inserting release tool 300 into the opposite end of column 120, and rotating release tool 300 to release spring clips 143. In such embodiments, guides 303 may conveniently be adapted such that, upon insertion of release tool 300 into column 120, guides 303 may be placed against the sides of ribs 124, thereby properly orienting prongs 302 to engage spring clips 143.

Referring to FIG. 13, an alternate embodiment of release tool 300' may also be used in substantially the same manner as release tool 300. Release tool 300' may conveniently be constructed of plastic with either plastic or metal prongs 301' and post 302' (which operate in substantially the same manner as is described above for prongs 301 and post 302). Release tool 300', however, does not include an adapter for an extension or guides. Accordingly, while potentially less expensive to produce, release tool 300' is generally not easily adapted for insertion into columns 120 and release of spring clips 143 from above. Otherwise, the operation of release tool 300' is substantially identical to that of release tool 300, as has been described above.

Referring again to FIG. 1, trophy assembly 100 may be completed by adding figure 150 to the second end 122 of column 120. FIG. 16 further illustrates an embodiment of figure 150, which comprises a decorative element 154 and an integral upper clip 160 configured and dimensioned to engage at least one of ribs 124 when figure 150 is placed over column end 122 and rotated, whereby figure 150 is joined to column 120. In a preferred embodiment, upper clip 160 is generally similar to, and may conveniently be substantially identical to, or a mirror image of, lower clip 140 and is molded into figure 150. In such embodiments, upper clip 160 comprises at least two upper tabs 161, at least one upper stop 162, and at least one upper spring clip 163. Whereas the preferred embodiment of lower clip 140 discussed above preferably has two spring clips 143 that can be released by release tool 300/300', upper spring clip 163 may conveniently have only a single spring clip 163, as is discussed further below.

Ribs 124 further comprise upper slots 126 (Shown in FIGS. 1, 2-7) adapted to be engaged by upper tabs 161 when figure 150 is placed over second column end 122 and rotated. Just as with lower clip 140, and as was previously described, upper spring clip 163 is deflected by ribs 124 substantially until upper tabs 161 engage upper slots 126, upon which upper spring clip 163 is released and resists reverse rotation of figure 150 by engaging rib 124. While having multiple spring clips 163 is possible, and has the benefit of adding increased resistance to reverse rotation, having only one spring clip 163 has the advantage of allowing figure 150 to be released from column 120 with the use of a long screw driver (not shown) inserted into column 120 from first column end 121, which screwdriver is then used to pull back spring clip 163 to allow figure 150 to be reverse-rotated and removed. In embodiments having more than one spring clip 163, a release tool capable of simultaneously retracting all spring clips 163 simultaneously (such as, for example and without limitation, release tool 300 which is illustrated in FIGS. 11 and 12, and is capable of releasing 2-spring clip embodiments) is needed for convenient release of figure 150.

Also as with lower clip 140 (shown on FIGS. 8-10 and described above), upper clip 160 (shown on FIG. 16) includes upper stops 162 adapted to engage ribs 124 substantially upon engagement of upper tabs 161 with upper slots 126, thereby resisting over-rotation of figure 150. In this way, figure 150 is locked to column 120 with upper stops 162 resisting forward rotation and upper spring clips 163 resisting reverse rotation. While at least one upper stop 162 may be used to resist over-rotation, having one upper stop 162 per rib 124 is preferred for added strength. It is apparent that, while upper clip 160 need not be substantially identical to, or a mirror image of lower clip 140, if it is, then trophy assembly 100 may be disassembled by using release tool 300 first to release column 120 from base 110, and then by inserting release tool 300 with extension(s) 305 of an appropriate length (for 2-spring clip embodiments) or a long screw driver (not shown) (for single spring clip embodiments) into column 120, and releasing figure 150.

Figure 18:
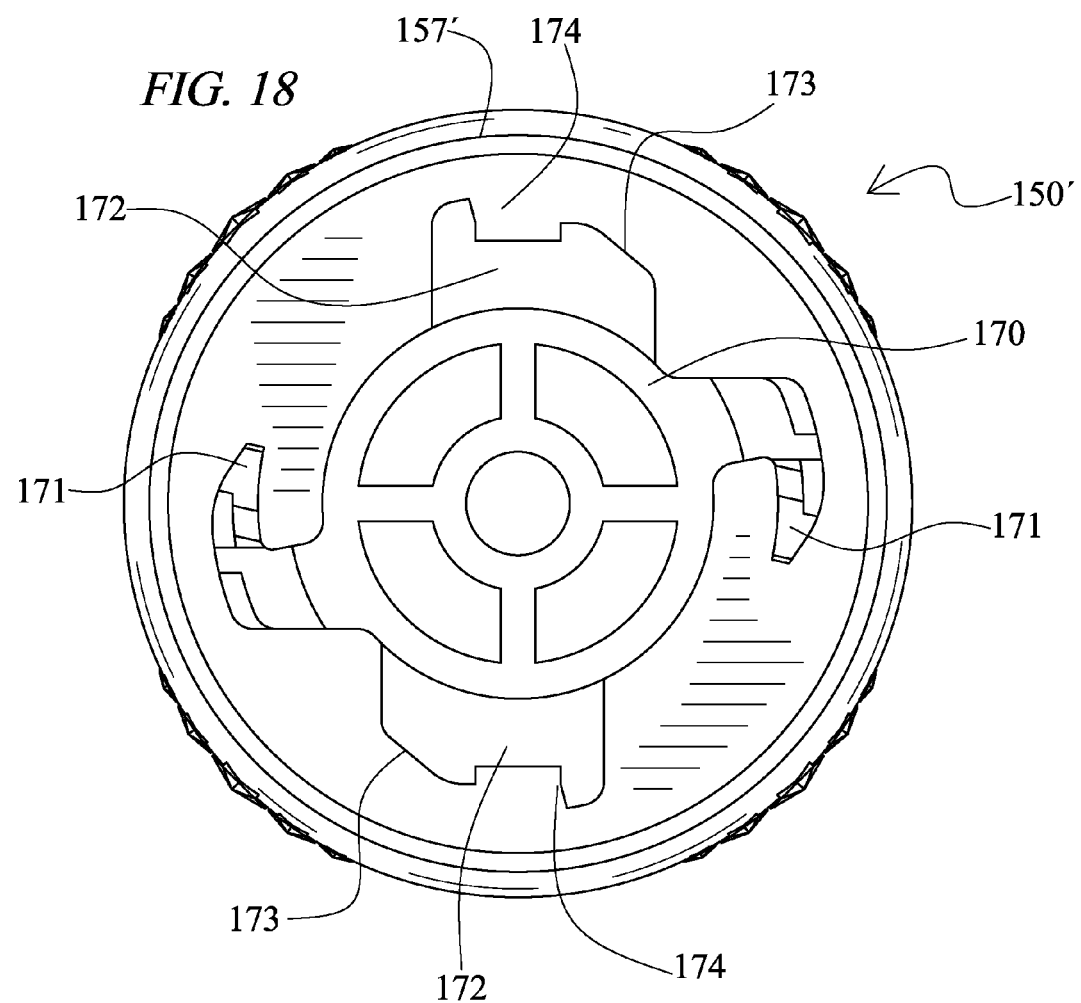
FIG. 18 is a plan view of the upper clip integral to the trophy figure of FIG. 17.

As is illustrated in FIGS. 17 and 18, figure 150' may also conveniently comprise a decorative element 154', and an alternative embodiment of upper clip 170. In such embodiments, upper clip 170 comprises at least two upper tabs 171 and at least one, and preferably two, upper deflectors 172. As with the previously described embodiments, upper tabs 171 are adapted to engage upper slots 126 in ribs 124. Upper deflectors 172, however, comprise a deflection surface 173 adapted such that, upon placing figure 150 over second column end 122 and rotating figure 150, deflection surface 173 engages ribs 124 and deflects ribs 124 outward, deforming column 120. Substantially upon upper tabs 171 engaging upper slots 126, deflection surface 173 passes ribs 124, and ribs 124 enter recessed cavity 174, thereby allowing column 120 to return substantially to its original form. As a result, substantially upon upper tabs 171 fully engaging upper slots 126, ribs 124 are captured in recessed cavities 174, thereby resisting further forward or reverse rotation of figure 150', while upper tabs 171 secure figure 150' to column 120. Alternative embodiments of upper clip 170 further comprise an optional nib 175 adapted to engage an optional groove 128 (as shown on FIGS. 6-7). Just as nib 175 is optional in upper clip 170, groove 128 is optional in column 120 (but is preferably present when nib 175 is used). When utilized, groove 128 is preferably formed on the inside-facing surface of rib 124. Nib 175, when used, is formed generally in the center of recessed cavity 174 and is adapted to engage groove 128 upon full engagement of upper tabs 171 into upper slots 126. Nib 175 and groove 128 then act to center rib 124 within recessed cavity 174 and further resist rotation.

As with the previously described embodiments, upper tabs 171 may conveniently be thinner at their leading tips and thicker at their bases, and upper tabs 171 and/or upper slots 126 may be angled such that second column end 122 is urged against figure 150 upon rotation, thereby creating a more rigid trophy assembly 100. While the preferred embodiments illustrated comprise two upper tabs 171 and two upper deflectors 172, it will be understood that embodiments using more than two upper tabs 171, only one upper deflector 172, or more than two upper deflectors 172 are possible. It is also noted that in the preferred embodiment illustrated, upper deflectors 172 are conveniently adapted to engage ribs 124 between column end 122 and upper slots 126. While such a configuration is convenient, as it positions the upper deflectors 172 near second column end 122, thereby reducing the amount of force needed to deform column 120 during rotation, upper deflectors 172 could be positioned higher or lower if desired for convenience of molding or as a matter of choice. It is further noted that, whereas upper clip 160 may conveniently be released from column 120 with a release tool 300 or screw driver (not shown), as is discussed above, upper clip 170 is not conveniently released once engaged.

Referring again to FIGS. 1, 16-18, it is noted that upper clips 160 and 170 may conveniently be molded into the base of figures 150 and 150'. Alternatively, as shown in FIG. 16, upper clip 160 (and if desired 170 (not shown)) may be molded separately and then attached to figure 150 through friction, plastic welding, adhesive bonding, or other techniques known to those of skill in the art. In such embodiments, figure 150 may optionally comprise one or more posts 155 adapted to be received by voids (not shown) in upper clips 160 (and, if preferred, 170 (not shown)) to facilitate bonding and alignment.

It is further noted that alignment of lower tabs 141 and upper tabs 161 and 171 should be such that, upon assembly of trophy assembly 100, figure 150 or 150' and base 110 are properly oriented. It is also noted that, while FIGS. 150 and 150' normally comprise a decorative element 154 or 154' representing the achievement represented by the trophy, such decorative element 154 or 154' could be of virtually any shape or configuration thought to be aesthetically pleasing, many of which are well known within the trophy industry.

As illustrated in FIGS. 16-17, figure 150/150' may also preferably include a lip 157/157' adapted such that opposed column end 122 is covered by lip 157/157' upon assembly of figure 150/150' onto column 120. In embodiments of figure 150' utilizing upper clip 170, sufficient clearance may be provided between column 120 and lip 157' to allow column 120 to deform the extent necessary for ribs 124 to enter cavity 174, as is described above.

Figure 19:
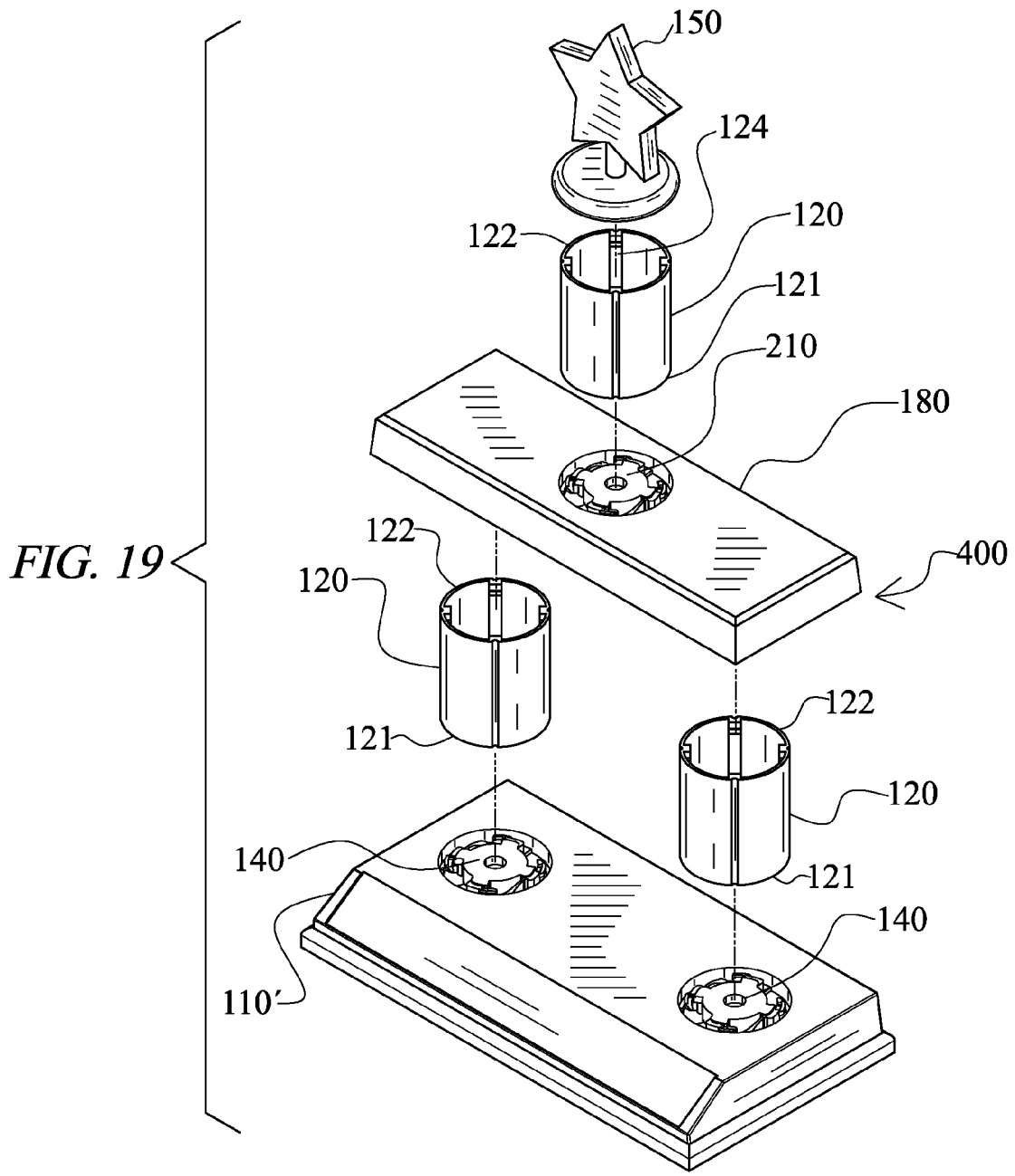
FIG. 19 is an exploded, perspective view of an embodiment of the trophy assembly of the present invention having multiple columns, a trophy base with integral lower clips, an upper platform having integral upper clips and an integral upper platform top clip, an upper column, and a figure with an integral upper clip.
Figure 23:
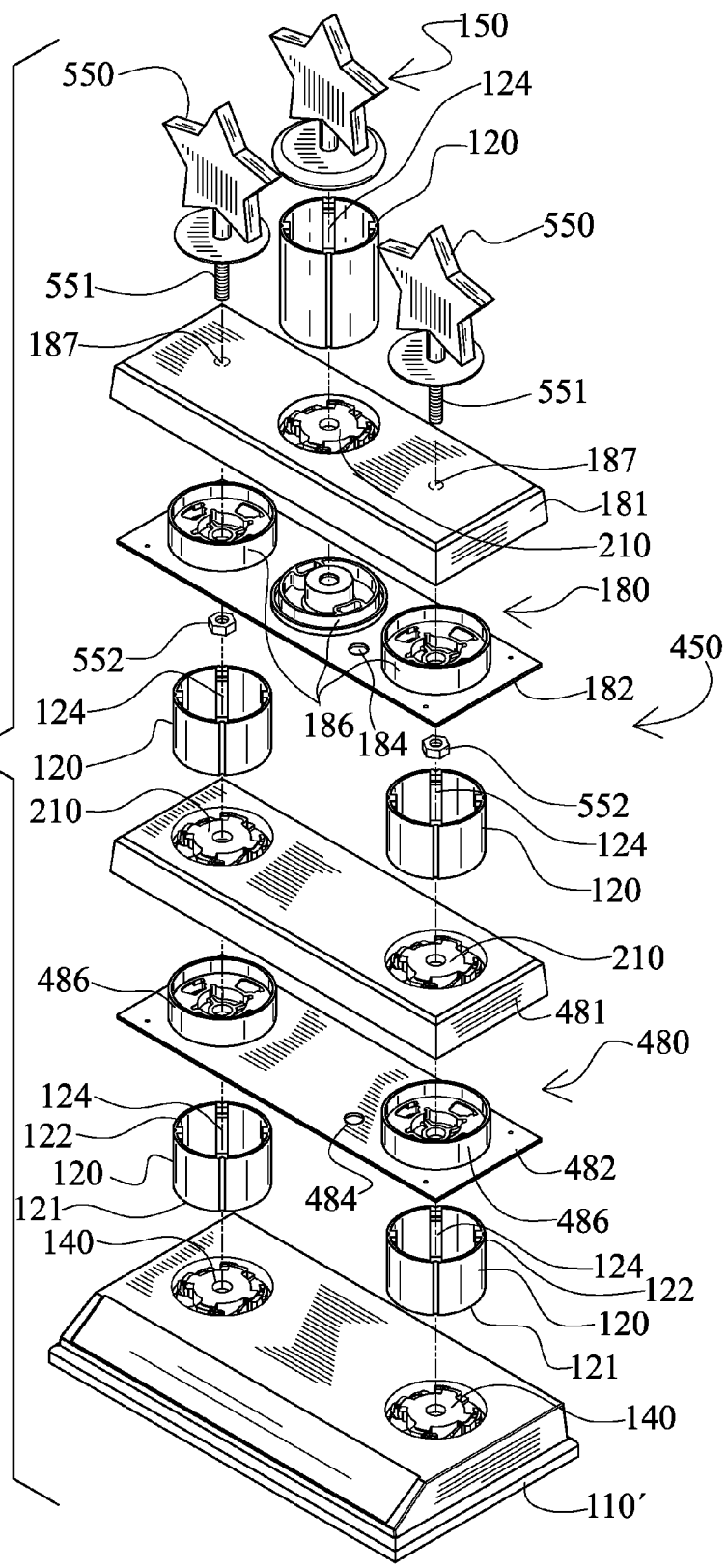
FIG. 23 is an exploded, perspective view of an embodiment of the trophy assembly of the present invention having multiple columns, a trophy base with two integral lower clips, a platform having two integral upper clips and two integral platform top clips, a platform having integral upper clips and an integral platform top clip, an upper column, and a figure with an integral upper clip.

As illustrated in FIGS. 19 and 23, embodiments of the present invention also include multi-column and multi-level trophy assemblies 400 and 450. In such embodiments, base 110' comprises a plurality of lower clips 140, each adapted to attach to a column 120 as described above. While rectangular bases 110' having two (illustrated), and square rectangular bases (not shown) having four lower clips 140, and triangular bases (not shown) having three lower clips 140 are preferred, it will be clear to those of ordinary skill in the art the present invention is suitable for trophy bases of virtually any design and with virtually any number of columns 120.

Figure 20:
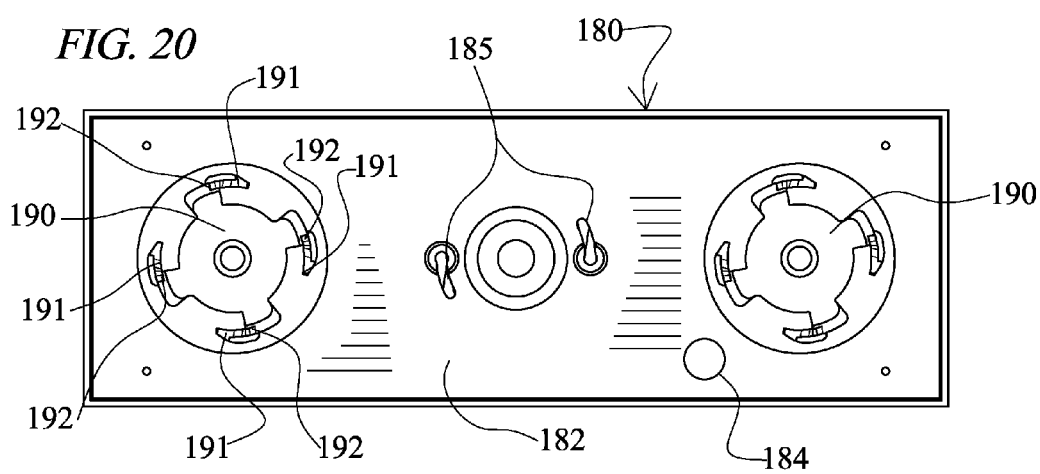
FIG. 20 is a plan view of the bottom side of an embodiment of the upper platform embodiment of the trophy assembly illustrated in FIG. 19, having two integral upper clips and upper platform release slots.
Figure 21:
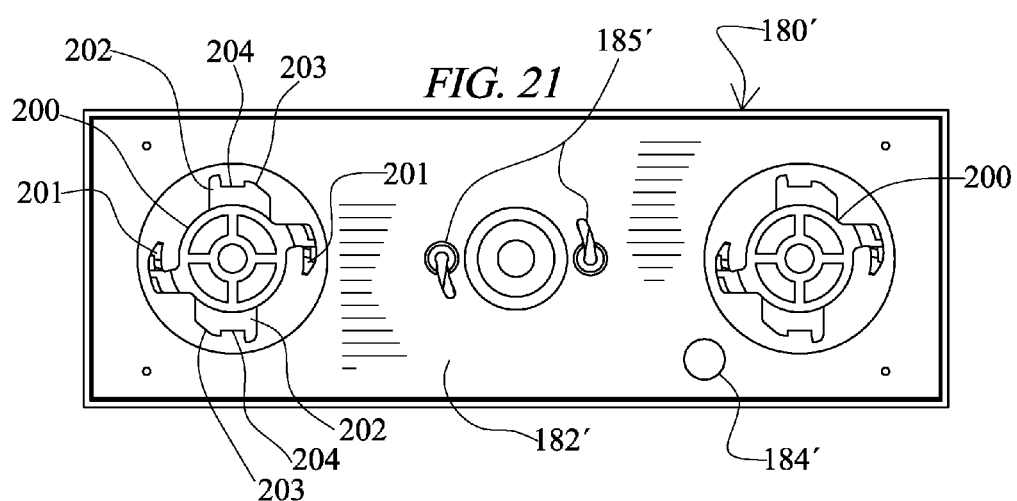
FIG. 21 is a plan view of the bottom side of an alternate embodiment of the upper platform of the trophy assembly illustrated in FIG. 19, having two integral upper clips and upper platform release slots.

Multi-column trophy assembly embodiments also often have multiple levels. As shown in FIGS. 19-21, in such embodiments platform 180 comprises upper clips 190 (or if preferred 200) adapted such that when first column ends 121 are placed over lower clips 140, and platform 180 is placed over second column ends 122, and columns 120 are rotated, lower clips 140 and upper clips 190 or 200 engage ribs 124 whereby base 110, columns 120, and platform 180 are joined.

As shown in FIG. 20, a preferred embodiment of platform 180 comprises upper clips 190. Upper clip 190, substantially similar to upper clip 160, comprises upper tabs 191 adapted to engage upper slots 126 (shown on FIGS. 2-7). While the embodiment illustrated, also like upper clip 160, comprises stops 192 (adapted to prevent over-rotation) and may optionally include one or more spring clips (not included in the illustrated embodiment) adapted to prevent reverse rotation, it is understood that stops 192 and spring clips are optional as stops 142 and spring clips 143 in lower clip 140 will prevent forward and reverse rotation of column 120 even if upper clip 190 comprises only tabs 191. It is also noted that upper tabs 191 must be properly oriented and must be substantially the mirror image of lower tabs 141 in lower clip 140. Otherwise, rotation of column 120 would not cause both upper tabs 191 and lower tabs 141 to engage upper slots 126 and lower slots 125 respectively in the proper direction, and substantially simultaneously. Additionally, it is noted that, if upper spring clips are utilized, release tool 300 (shown on FIGS. 11-12), when appropriate extensions 305 (also shown on FIGS. 11-12) are used, can be used to release platform 180 from columns 120 (shown on FIG. 19) after base 110' has been released when two spring clips are used, and a screw driver (not shown) may be used to release platform 180 when one spring clip is used.

It is further noted that, as is illustrated in FIG. 21, upper clip 200 of alternate embodiment of platform 180', which is substantially identical to upper clip 170 illustrated in FIG. 18, could also be used on the lower side 182' of platform 180' if so desired. In such embodiments, upper clip 200 comprises upper tabs 201, and upper deflectors 202. Upper deflectors 202 comprise upper deflection surface 203 and recessed cavity 204 (which may or may not include a nib (not shown) as described above). In such embodiments, upper clip 200 operates just as upper clip 170, described previously, operates. However, in such embodiments, upper tabs 201 should be oriented in the opposite direction of lower tabs 141 such that, both upper tabs 201 and lower tabs 141 engage upper slots 126 and lower slots 125 from the same direction when column 120 is rotated. Upper tabs 201 should also be positioned such that they engage upper slots 126 at substantially the same time as lower slots engage lower slots 125.

Figure 22:
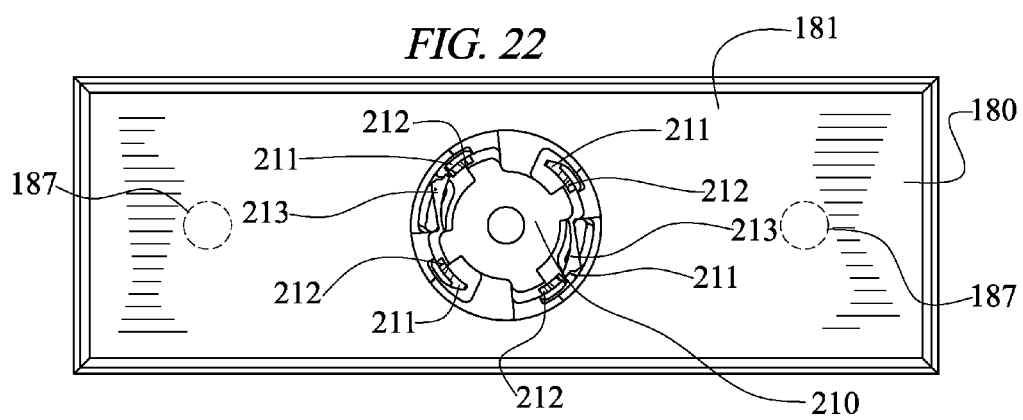
FIG. 22 is a plan view of the top side of an embodiment of the upper platform of the trophy assembly illustrated in FIG. 19.

As shown in FIGS. 19 and 22, a platform 180 comprises at least one platform top clip 210. Column 120 (described above) and its embodiments including 120' and 120", may be used as a lower column or an upper column. When used as an upper column, column 120 is configured and dimensioned to fit over platform top clip 210. Platform top clip is then generally similar to, and may suitably be essentially identical to, lower clip 140 (illustrated on FIG. 8), is adapted to engage ribs 124 in upper column 120, and may preferably comprise platform top clip tabs 211, at least one platform top clip stop 212, and at least one platform top clip spring clip 213. The structure and operation of platform top clip 210 is thus substantially the same as the structure and operation of lower clip 140, which has been described above.

It is also noted that platform 180 and 180' may also conveniently include optional holes 187. As is illustrated in FIG. 23, and as is described further below, if a trophy assembler wishes to include figures 550 having studs 551 on a trophy assembly having platform 180 or 180', studs 151 may be inserted through holes 187, and secured with nuts 552 to platform 180 or 180', prior to rotation of columns 120. In this way, existing stocks of trophy figures with studs may be used with assemblies comprising platform 180 or 180'. To accommodate such embodiments, it is convenient for platforms 180 and 180' to include partially formed holes 187 such that assemblers who do not wish to utilize figures 550 may utilize platforms 180 and 180' without drilling, while assemblers who do wish to utilize figures 550 may do so by drilling through the bottom of platforms 180 and 180', using the partially formed holes 187 as a guide. This allows greater flexibility as assemblers may construct assemblies with and without figures 550 without having to maintain separate stocks of platform 180/180', some of which include hole 187 and some of which do not.

As will be apparent to those of ordinary skill in the art, in addition to trophy assemblies having platforms 180/180' with a single platform top clip 210, platforms 180/180' having multiple platform top clips 210 can also be used. As is illustrated in FIG. 23, in such configurations platform 480 includes platform top clips 210 and upper clips 190/200 (as illustrated in FIGS. 20 and 21 and discussed above). Continuing with FIG. 23, using platforms 480, trophy assemblies with several levels may be constructed, with each platform 480 serving as a base supporting the upper columns 120 of the next level. In this manner trophy assemblies of virtually any size and configuration may be constructed with the present invention. As with base 110', while rectangular platforms 480 having two upper clips 190/200 (shown on FIGS. 19 and 20 and discussed above) and two platform upper clips 210 (as shown on FIG. 23), square platforms (not shown) having four upper clips 190/200 and four platform upper clips 210, and triangular platforms (not shown) having three upper clips 190/200 and three platform upper clips 210 are preferred, it will be readily understood by those of ordinary skill in the art that virtually any configuration of platform adapted to receive and support virtually any combination of numbers of columns and upper columns may be constructed according to the present invention.

As is illustrated in FIGS. 20-21, embodiments of platform 180 in which platform top clip 210 is not opposite upper clip 190/200, platform 180 may further comprise platform release slots 185 opposite upper platform top clip(s) 210. Such release slots 185 are adapted such that inserting prongs 301/301' of release tool 300/300' into slots 185, and rotating release tool 300/300', will retract platform top clip spring clips 213, thereby releasing upper column 120 from platform 180 (see also FIGS. 11-15 and related description for further description of the operation of release tool 300/300'). It is also noted that, where platform top clip 210 is opposite of upper clip 190, it is possible to leave sufficient space to release platform top clip 210 through upper clip 190 using release tool 300/300'.

It is further noted that platforms 180/180' may conveniently be formed of molded ABS or other plastics known in the art in two pieces as is illustrated in FIG. 23. In such embodiments, platform 180 comprises platform top 181 and platform bottom 182 (or 182' as shown in FIG. 21), which may be assembled via friction fit, adhesives, the use of mechanical clips or fasteners, or via any of a variety of means well known in the art. In such embodiments, platform bottom 182/182' may further comprise hole 184/184', which allows the insertion of ballast (not shown) such as plaster of Paris into platform 180/180' after assembly to add weight and, optionally, serve to hold platform bottom 182/182' and platform top 181 together upon drying. When such ballast is used, it is convenient to include barriers 186 which may optionally align with top barriers (not illustrated) to prevent ballast (not illustrated) from interfering with upper clips 190/200 and platform top clip(s) 210, and to assist with alignment during assembly.

The same is true of platform 480, which may also conveniently be formed of molded ABS or other plastics known in the art in two pieces as is illustrated in FIG. 23. In such embodiments, platform 480 comprises platform top 481 and platform bottom 482, which may be assembled via friction fit, adhesives, the use of mechanical clips or fasteners, or via any of a variety of means well known in the art. In such embodiments, platform bottom 482 may further comprise hole 484, which allows the insertion of a ballast (not shown) such as plaster of Paris into platform 480 after assembly, also to add weight and, also, optionally, to serve to hold platform bottom 482 and platform top 481 together. When such a ballast is used, it is also convenient to include barriers 486 which may optionally align with top barriers (not illustrated) to prevent ballast (not illustrated) from interfering with upper clips 190/200 and platform top clip(s) 210, and to assist with alignment during assembly.

Figure 24:
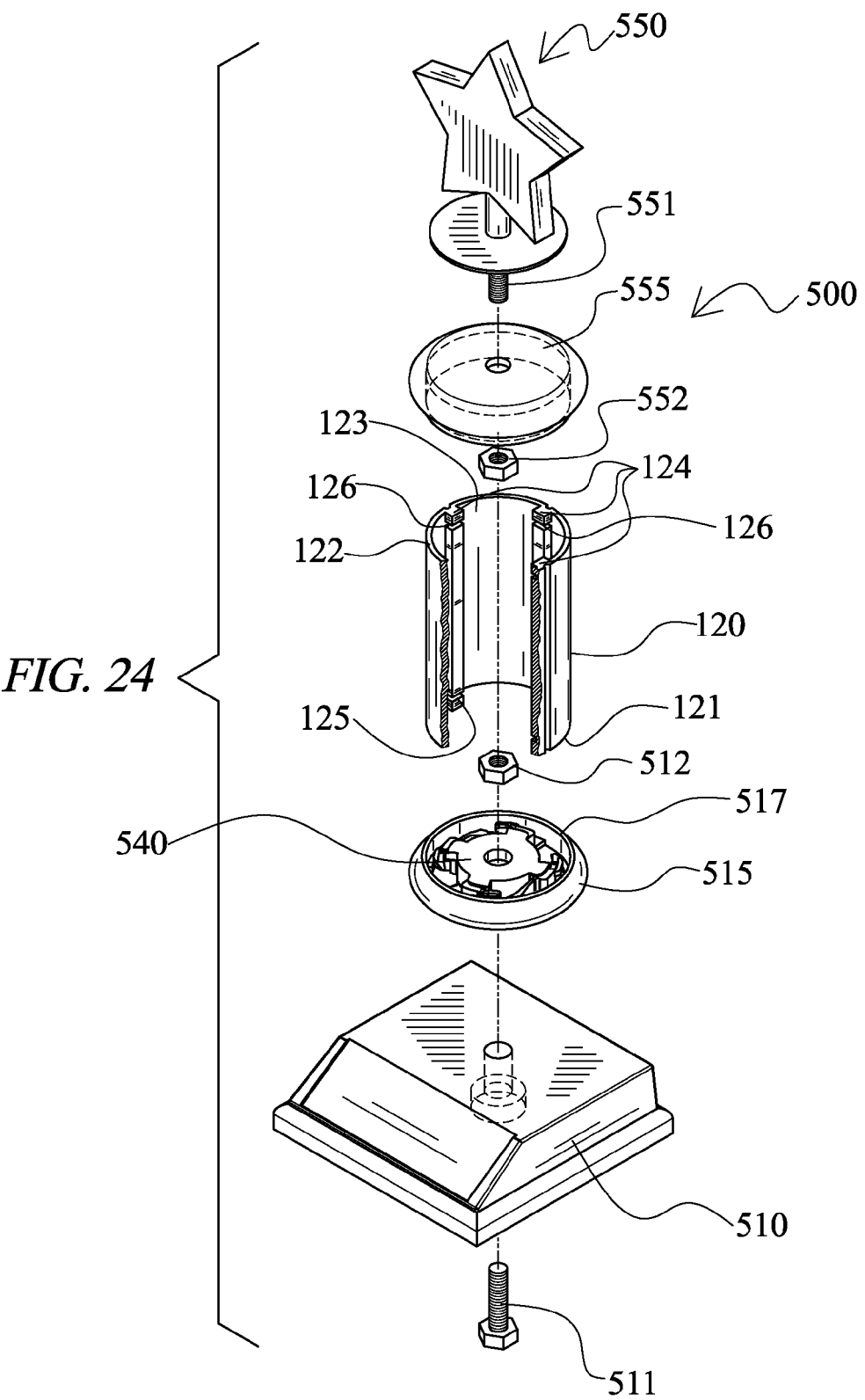
FIG. 24 is an exploded, perspective view, showing an embodiment of the trophy assembly of the present invention having a base attached to a lower lid, a column, and a figure attached to an upper lid.
Figure 28:
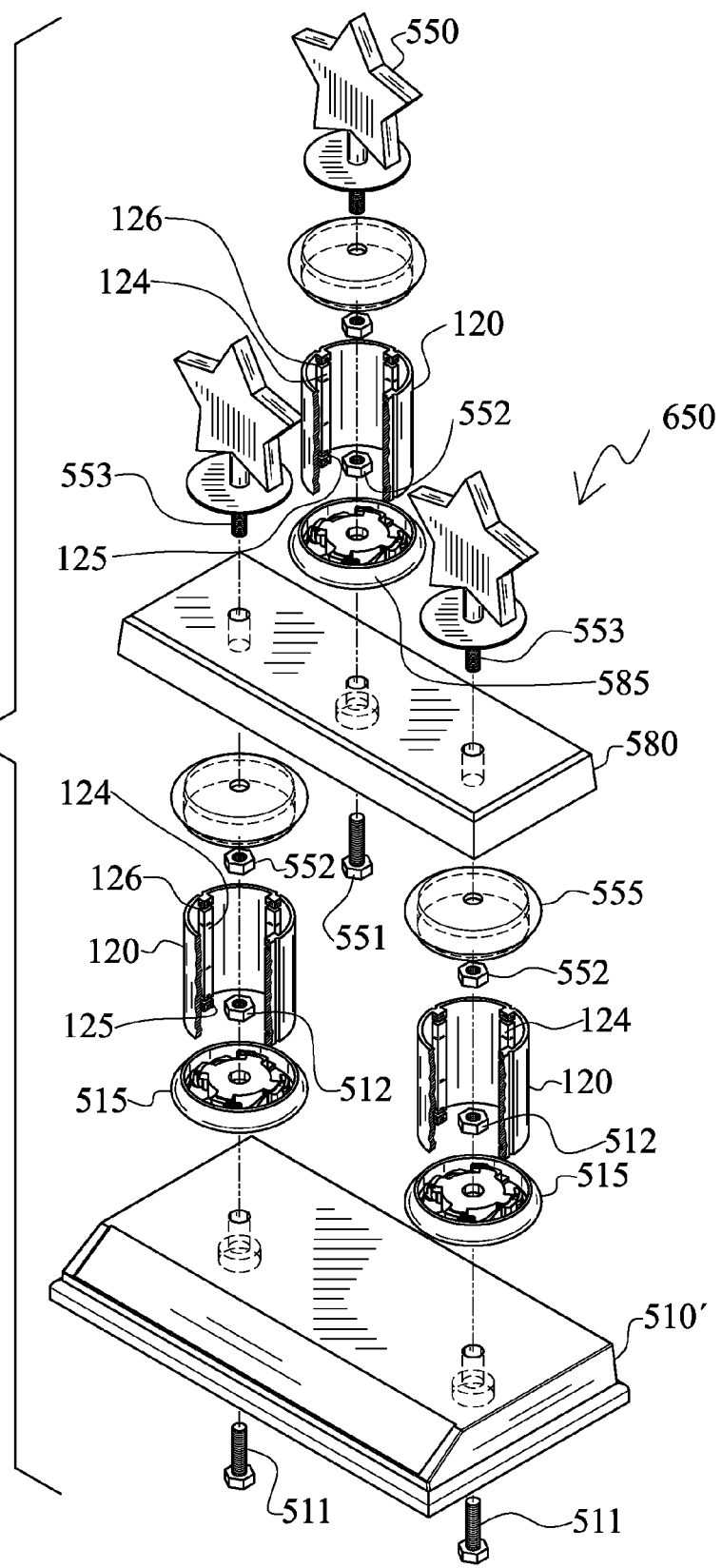
FIG. 28 is an exploded, perspective view of an embodiment of the trophy assembly of the present invention having multiple columns, a trophy base attached to lower lids, an upper platform attached to upper lids and a lower lid, an upper column, and a figure attached to an upper lid.

The present invention also encompasses embodiments that allow the use of existing bases, platforms, and figures with the column and interlock mechanisms described herein. This has the advantage of allowing for the creation of a greater variety of trophy assembly designs by allowing trophy dealers to use existing parts originally designed for use with trophy assemblies using threaded rods, in combination with the bases, columns and/or figures of the present invention. Such combinations are preferably created by attaching lids comprising clips adapted to engage interior column ribs to bases, figures and platforms designed for use with threaded rod assemblies. FIGS. 24 and 28 illustrate embodiments of such assemblies 500, 650.

As shown in FIG. 24, base 510 is a traditional trophy base which may be constructed of any material commonly used for such bases including, without limitation, plastic, wood, composite board or marble. To use base 510 with column 120, lower lid 515 is used. Lower lid 515 is preferably molded of plastics such as Styrene or ABS, but may be made of any of a variety of materials known to those of ordinary skill in the art. Lower lid 515 may be attached to base 510 via a threaded stud integral to the base (not shown), or a bolt 511 and nut 512, or via adhesives, clips or other fastening means known in the art.

Figure 25:
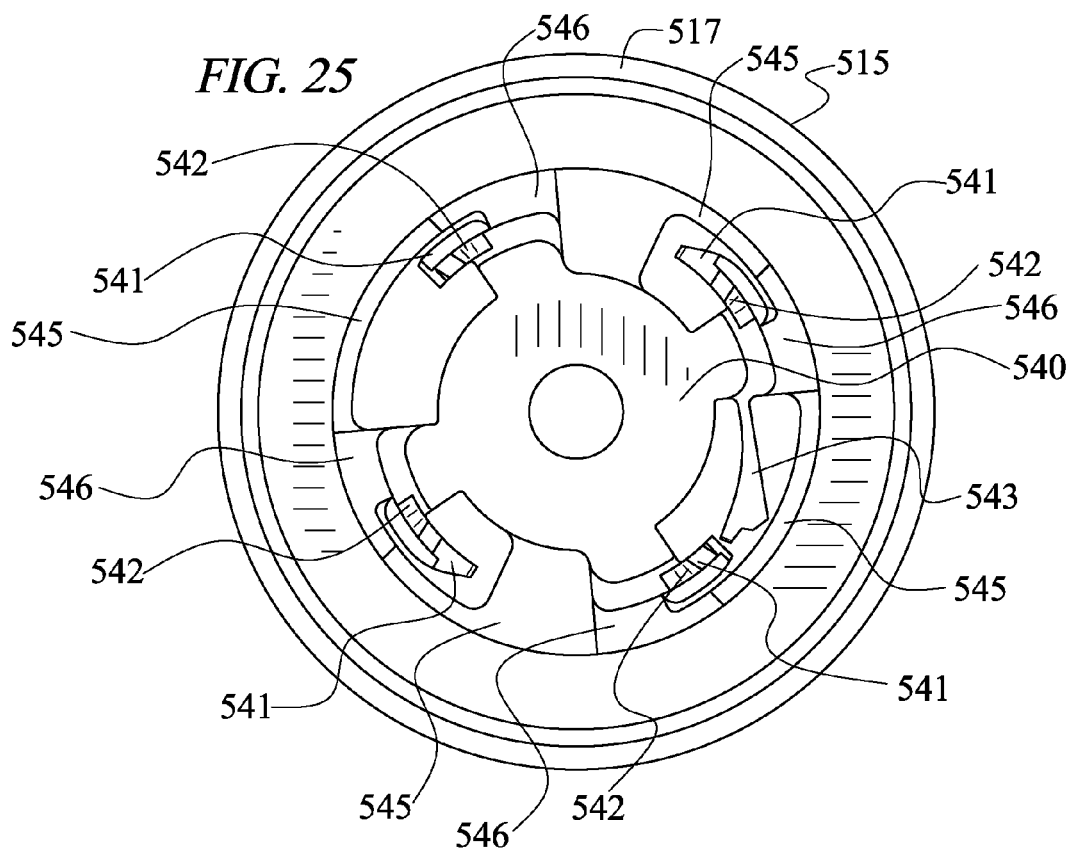
FIG. 25 is a plan view of the top side of an embodiment of a lid with an integral clip having a spring clip suitable for use as a lower lid or an upper lid.

As shown in FIG. 25 lower lid 515 comprises lower clip 540, which is adapted to engage ribs 124 on interior surface 123 of column 120. It is noted that embodiments of lower clip 540 are also generally similar to, and may suitably be substantially identical to, embodiments of lower clip 140, described above. As such, any embodiments of lower clip 140 are also embodiments of lower clip 540 and vice versa. Accordingly, the embodiment of lower clip 540 illustrated in FIG. 25 comprises at least two lower tabs 541, at least one lower stop 542, and at least one lower spring clip 543. In the preferred embodiment illustrated, four lower tabs 541 are used to engage four ribs 124 on interior surface 123 of column 120. In that embodiment, each lower tab 541 includes a lower stop 542 adapted to engage rib 124 when lower tab 541 fully engages lower slot 125. Lower spring clip 543 is also used in this embodiment, which spring clip 543 is deflected by ribs 124 upon rotation of column 120, substantially until lower tabs 541 engage lower slots 125, at which point, lower spring clip is released 543 and acts to prevent reverse rotation of column 120, whereby column 120 is attached to lower lid 515. Preferably lower lid 515 has earlier been attached to base 510 as is described above, thereby allowing column 120 to connect to base 510 through lower lid 515.

As is illustrated in FIG. 24, Lower lid 515 may further comprise a lip 517. Lip 517 is adapted to cover lower column end 121 when column 120 is inserted into lower lid 515, thereby creating a more pleasing appearance.

Figure 26:
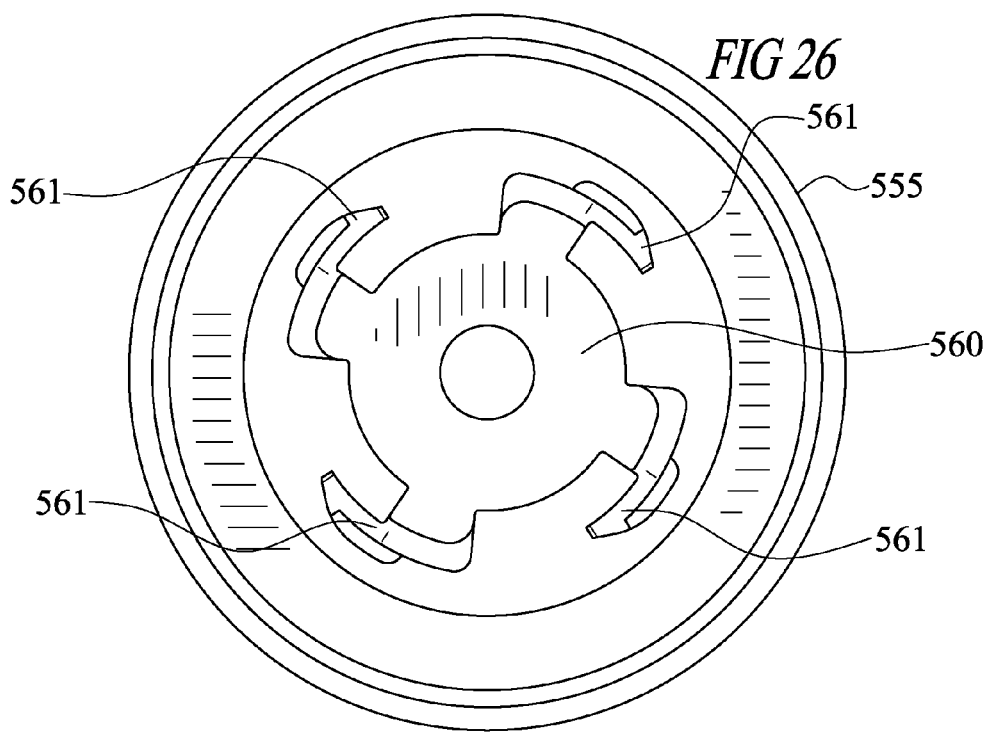
FIG. 26 is a plan view of an embodiment of an upper lid of the present invention.

Still referring to FIG. 24, trophy assembly 500 can be completed by adding a figure 550. Figures 550 adapted to work with threaded rod trophy designs commonly incorporate a threaded stud 551. Such figures 550 can be adapted for use with column 120 by attaching upper lid 555 to figure 550 with a nut 552. Upper lid 555, like lower lid 515, is generally molded of plastics such as styrene or ABS, and incorporates upper clip 560 (as shown in FIG. 26). Continuing with FIG. 26, upper clip 560 is adapted to engage at least one of ribs 124 upon placement of upper lid 555 over the end of column 120 and rotating column 120, whereby upper lid 555, figure 550, and column 120 are joined.

Embodiments of upper clip 560 are generally similar to, and may suitably be substantially identical to, embodiments of upper clips 160, 190 described above, and vice versa. Moreover, upper lid 555 may suitably be substantially identical to, or a mirror image of, lower lid 515. In the embodiment illustrated in FIG. 26, upper clip 560 comprises four upper tabs 561 adapted to engage upper slots 126 in interior ribs 124 of column 120 (illustrated in FIGS. 2, 3, 6, 7) upon placement of upper lid 555 over second column end 122 and rotating column 120. As will be apparent to those of ordinary skill in the art, when upper lid 555 is utilized with figures 550 (as is illustrated on FIG. 24), is preferred that upper clip 560 incorporate at least one (and preferably one) spring clip (not shown, but illustrated and described in the discussion of upper clip 160 above), and at least one stop (also illustrated and described in the discussion of upper clip 160 above), so that once upper clip 560 is engaged, the stop resists over rotation and the spring clip(s) prevent reverse rotation, thereby locking figure 550 onto column 120. Where upper lid 555 is utilized with a platform 580 as a platform lid (illustrated in FIG. 28 and described further below), embodiments of upper clip 560 without stops or spring clip(s) (as illustrated in FIG. 26) may be used as the stops 542 and spring clip(s) 543 of lower clip 540 (illustrated in FIG. 25) will serve to sufficiently resist over-rotation and reverse rotation of column 120.

Figure 27:
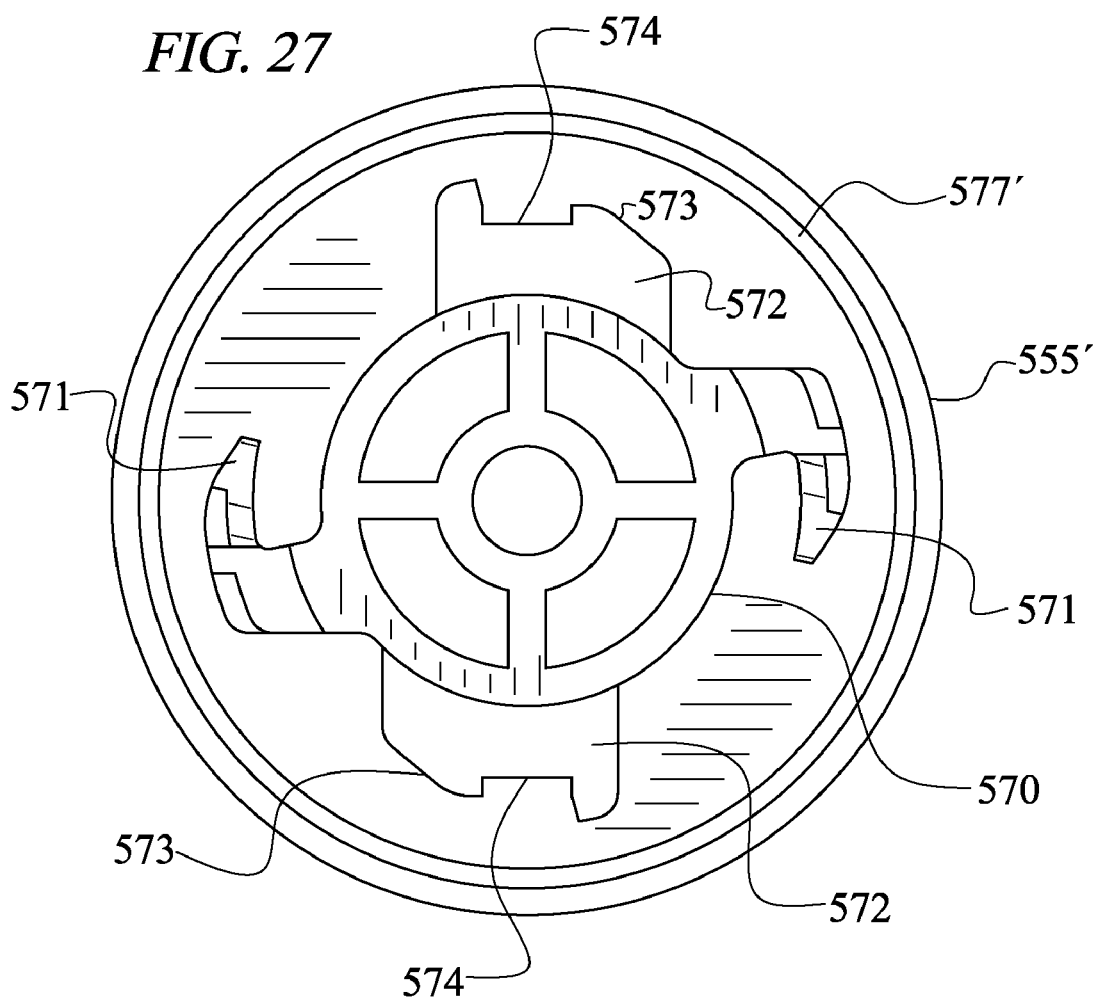
FIG. 27 is a plan view of an embodiment of a lid with an integral clip having deflectors suitable for use as an upper lid or a lower lid.

An alternative embodiment of upper lid 555' is illustrated in FIG. 27. In this embodiment, upper lid 555' comprises upper clip 570. Upper clip 570 is substantially similar to, and may suitably be substantially identical to, upper clip 170 described above and comprises two upper tabs 571 adapted to engage upper slots 126 of ribs 124, and two upper deflectors 572. Upper deflectors 572 comprise a deflection surface 573 and a recessed cavity 574, and are dimensioned and positioned such that, upon placing upper lid 555' over the end of column 120 and rotating upper lid 555', upper tabs 571 engage upper slots 126. Upper deflectors 572 also engage ribs 124, initially deflecting column 120 substantially until such time as upper tabs 571 engage upper slots 126. Substantially at the same time, rib 124 passes deflection surface 573, and is captured by recessed cavity 574. Upper tabs 571 and upper slots 126 thereby attach upper lid 555' to column 120, while recessed cavity 574 resists both forward and reverse rotation. By first attaching figure 550 to upper lid 555' as shown and then connecting upper lid 555' to column 120 in this manner, figure 550, upper lid 555', and column 120 are attached into trophy assembly 500. It should be noted that with lid 555', sufficient room must be left between upper deflectors 572 and lip 577' to allow for the deformation of column end 122 during attachment. It should also be noted that, as with upper clip 170, once upper clip 570 is attached to column 120, it may not be easily removed.

Multi-column and multi-level trophy assemblies can be also be created by using existing platforms with lids 515 and 555/555'. As shown in FIG. 28, existing platforms 580 adapted for use with threaded rod trophy designs can be attached to lids 515 and 555/555' with fasteners including, but not limited to studs 553, nuts 552 and bolts 551, or via adhesives or other fastening means known to those or ordinary skill in the art. Upon such attachment, a multi-level trophy can be assembled by placing columns 120 between the base 510' (which preferably has been attached to more than one lower lid 515) and platform 580 as shown, and rotating columns 120. In such embodiments, upper tabs 561, 571 will run in the opposite direction of lower tabs 541, so that when column 120 is rotated, both sets of tabs enter lower slots 125 and upper slots 126 respectively, and from the same direction.

To construct still more complex trophy assemblies, lower lid 515 may be attached to the upper side of platform 580 to serve as platform lid 585. Platform lid 585 thus allows for connection with upper column 120 to create a base for another platform (not shown) or a figure 550 which has, in turn, been connected to an upper lid 555 as has already been described. In this manner trophy assemblies of many columns and levels can be constructed.

It will be understood that trophy assemblies using combinations of the above described components are possible. By way of example, and without limitation, base 110 could be assembled with column 120, and then combined with an existing figure 550 by attaching figure 550 to upper lid 555 and the attaching upper lid 555 to column 120. Similarly, traditional base 510 could be attached to lower lid 515 and column 120, whereupon figure 150 with integral clip could complete the assembly. It will be apparent to those of ordinary skill in the art that many other variations and permutations using the components described above are also possible, and are within the scope of the present invention. It will also be apparent that while use of square base 510 (having room for attachment of one lower lid 515), and rectangular base 510' (having room for attachment of two lower lids 515) are illustrated, the lids 515, 555 and columns 120 of the present invention may be used with bases of virtually any size and description. Similarly, while rectangular platform 580 (having room for attachment of two upper lids 555 and one platform lid 585) is illustrated, the lids 515, 555 and columns 120 of the present invention may be used with platforms of virtually any size and description.

Figure 29:
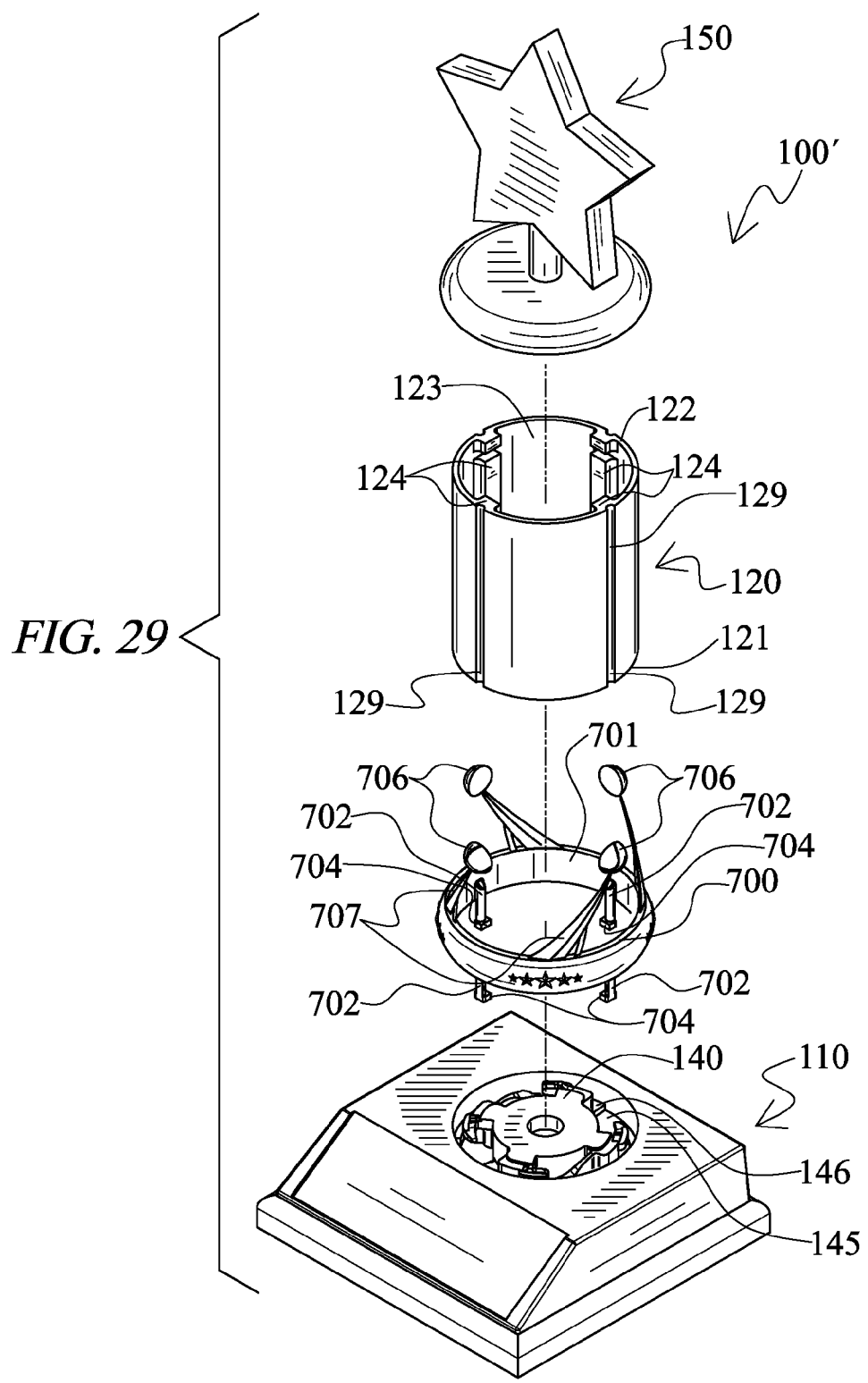
FIG. 29 is an exploded, perspective view of an embodiment of the trophy assembly of the present invention having a trophy base with an integral clip, an embodiment of a decorative ring, a column, and a figure with an integral upper clip.
Figure 30:
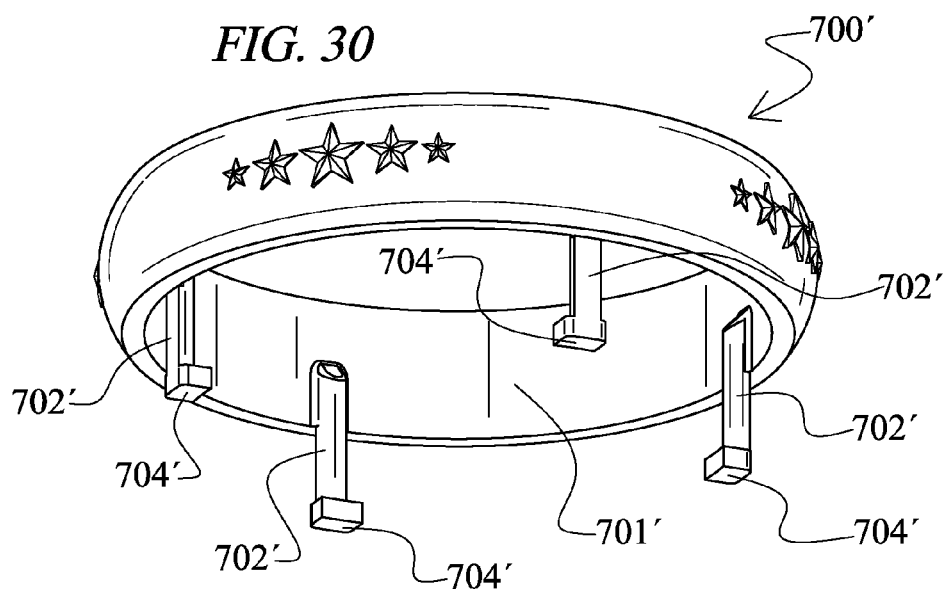
FIG. 30 is a perspective view of an embodiment of a decorative ring of the present invention suitable for use with trophy assemblies of the present invention.

The appearance of trophy assemblies 100, 400, 450, 500, 650 may be enhanced by the use of decorative ring 700/700', illustrated in FIGS. 29-30. In such embodiments, column 120 further comprises at least one, and preferably four, optional outer grooves 129 (illustrated as well in FIG. 7). Outer grooves 129 are preferably positioned opposite ribs 124. Decorative ring 700/700' has an inner ring surface 701/701' adapted to fit over column 120. Posts 702/702' on inner ring surface 701/701' are adapted to fit within outer grooves 129, thereby resisting rotation of decorative ring 700/700' about column 120 once decorative ring 700/700' is positioned. Posts 702/702' extend below decorative ring 700/700', ending in pedestals 704/704'. Pedestals 704/704' are adapted such that upon insertion of column 120 into base 110, first column end 121 engages pedestals 704/704', thereby holding decorative ring 700/700' in place.

As is illustrated in FIG. 8, base 110 may conveniently further comprise lower surfaces 145 and raised surfaces 146. Lower surfaces 145 and raised surfaces 146 are adapted such that, upon placement of column 120 into decorative ring 700/700', and subsequent placement of column 120 into base 110, first column end 121 rests upon raised surfaces 146 and pedestals 704/704' rest upon lower surfaces 145. Where the height of pedestals 704/704' is substantially the same as the difference in height between lower surfaces 145 and raised surfaces 146, lower column end 121 will rest upon both pedestals 704/704' and raised surfaces 146 upon assembly. Accordingly, lower surfaces 145 are preferably adapted such that there is sufficient space to rotate column 120 into full engagement with lower clip 140, prior to pedestals 704/704' engaging raised surfaces 146. It is further noted that, as decorative ring 700/700' is adapted to rest upon base 110, lower surfaces 145 are optional as base 110 will support decorative ring 700/700', while pedestals 704/704' prevent it from rising up as pedestals 704/704' are below first column end 121.

Optional lower surfaces 145 and raised surfaces 146 are deemed part of lower clip 140. Accordingly, lower surfaces 145 and raised surfaces 146 may be used in bases 110 and 110' (both of which incorporate lower clip 140), or in platform top clip 210 (which may be substantially identical to lower clip 140), or in lower lid 515 (which includes lower clip 540 which may be substantially identical to lower clip 140). It is also contemplated that upper clips 160, 170, 190, and 200 may also include analogous raised and lower surfaces (not illustrated), thereby allowing use of decorative ring 700/700' at either end of column 120. Similarly, an embodiment of lower lid 515 showing lower surfaces 545 and raised surfaces 546 (which are substantially similar to lower surfaces 145 and raised surfaces 146 respectively) is illustrated in FIG. 25, which allows decorative ring 700/700' to be used in assemblies incorporating lower lids 515 and upper lids 555 as well.

Referring again to FIG. 29, decorative ring 700 may also comprise decorative elements 706, which may conveniently extend above decorative ring 700 and include elements (softballs or footballs for example) that are indicative of the achievement commemorated by the trophy assembly. While many possible variations will be apparent to those of skill in the art, decorative elements 706 are shown as being supported by supports 707, which are formed as thin plastic strips adapted to give the impression of "speed lines" to indicate flight of decorative elements 706. As has been noted, embodiments of decorative ring 700/700' may be used both with embodiments of base 110/110' having integral lower clips, with embodiments of trophy assemblies 500 using lower lids 515 (illustrated in FIG. 24), or with embodiments of platform 180 using upper clips 210 (shown in FIG. 22), or with the other trophy components described herein, thereby creating additional permutations and variations of the trophy assemblies of the present invention.

Figure 31:
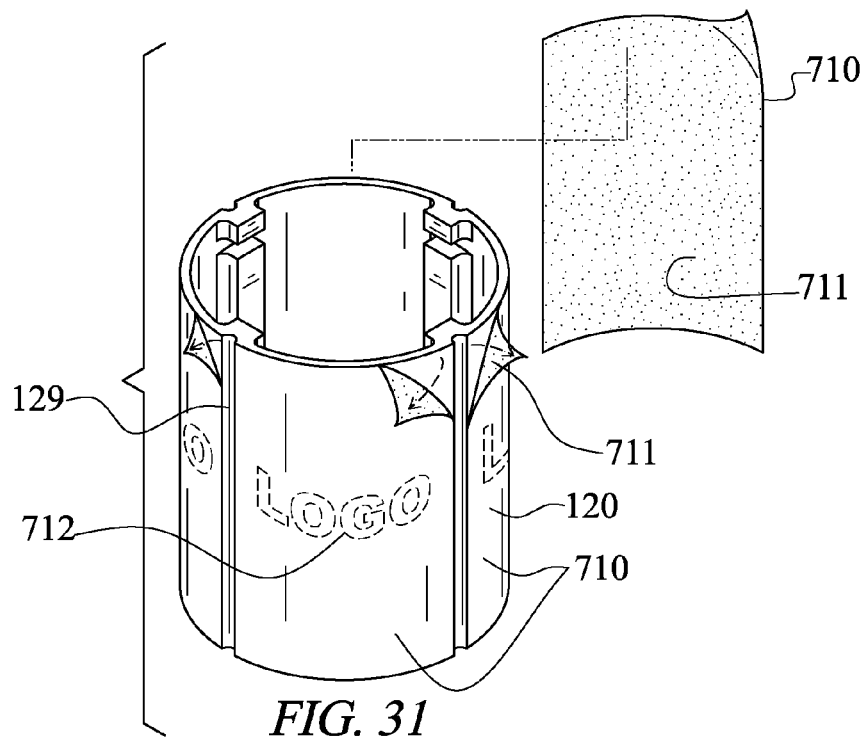
FIG. 31 is a perspective view of an embodiment of a trophy column of the present invention having a decorative wrap adhesively attached to the column's outer surface.

Referring to FIG. 31, the appearance of trophy assemblies 100, 400, 450, 500, 600, 650 of the present invention may be further enhanced by including a decorative film 710 on the outer surface of one or more of columns 120. Preferably, decorative film 710 will be a Mylar film having an adhesive side 711 and a decorative side 712. Decorative side 712 may display simple colors or patterns, images indicative of the achievement commemorated by the trophy assembly, or other aesthetically pleasing images. In embodiments utilizing outer grooves 129, decorative film 710 may preferably be adapted to be attached to column 120 between outer grooves 129 as shown. In embodiments having columns 120) with smooth outer surfaces (as illustrated in FIG. 6), decorative film 710 may conveniently wrap the entire column surface (not shown).

Figure 32:
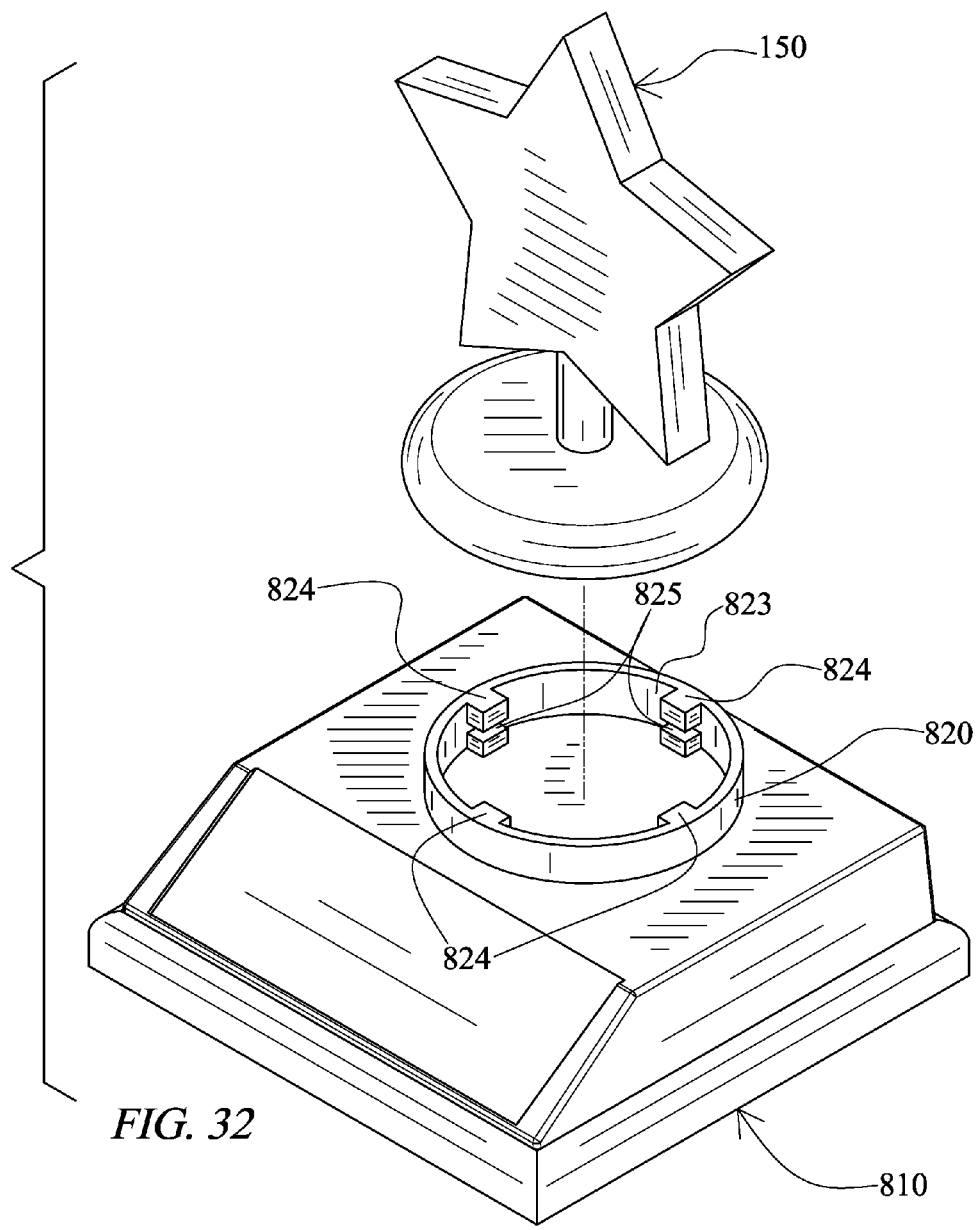
FIG. 32 is a perspective view of an embodiment of a trophy base of the present invention having an integral column stub serving as a column adapter.

In addition to the trophy bases previously discussed, the present invention includes base 810 as illustrated in FIG. 32. Whereas the trophy bases previously discussed included integral lower clips or were suitable for attachment with lower lids incorporating such clips, base 810 instead incorporates column stub 820. Column stub 820 incorporates column stub rib 824 conveniently formed on column stub inner surface 823. Column stub rib 824 incorporates column stub lower slots 825. In this manner figure 150 may be utilized directly with base 810 without a column. In such embodiments, column stub lower slots 825 are adapted to engage upper tabs 161 or 171 in the same manner as upper tabs 161 and 171 engage upper slots 126 on column 120 in trophy assembly 100 (as shown on FIG. 1 and previously described). This allows for the assembly of simple, low-cost trophy assemblies having a base 810 and a figure 150, but no column.

Figure 33:
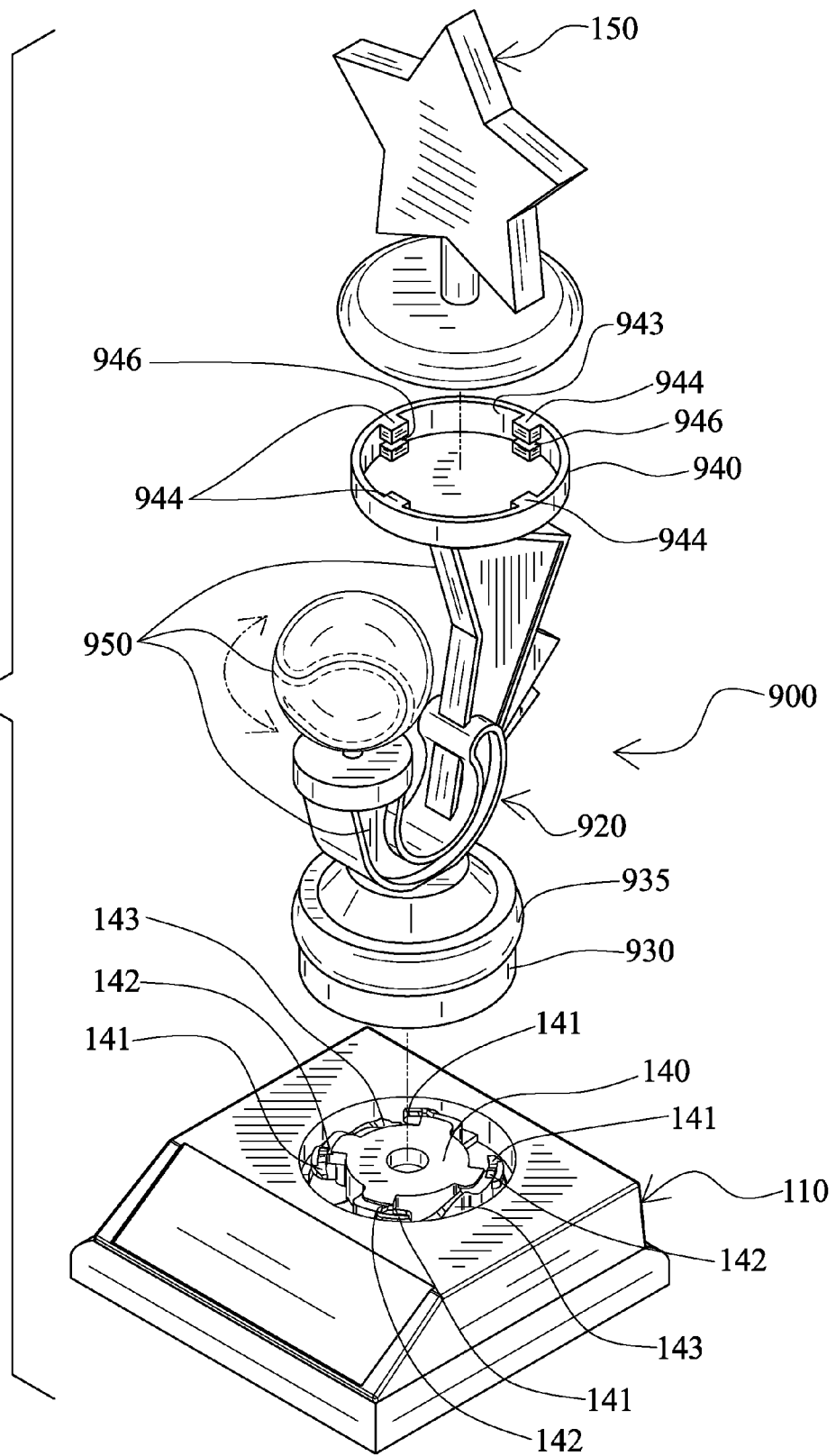
FIG. 33 is an exploded, perspective view of an embodiment of a trophy assembly of the present invention having a trophy base with integral clip, a riser having a lower column stub serving as a column adaptor and an upper column stub serving as a column adaptor, and a figure with an integral upper clip.
Figure 34:
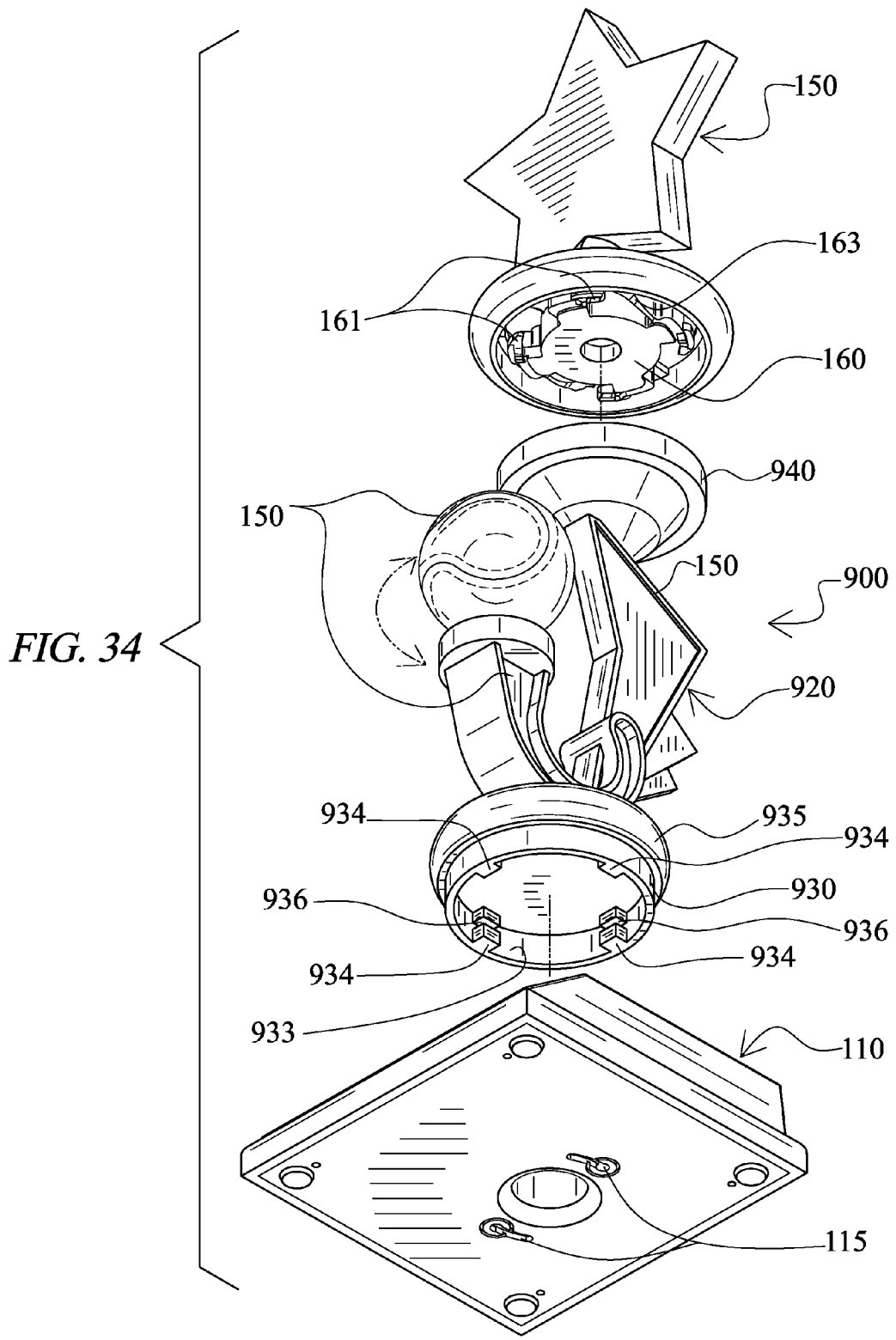
FIG. 34 is a further exploded, perspective view of the trophy assembly embodiment of FIG. 33.

The present invention further includes trophy assembly 900 which incorporates riser 920 as is illustrated on FIGS. 33-34. Riser 920 includes decorative elements 950 in between lower riser column stub 930 and upper riser column stub 940. While the decorative elements 950 illustrated include geometric designs and a baseball, it will be apparent to those of ordinary skill in the art that virtually any design imaginable could be incorporated into decorative elements 950.

As shown on FIG. 34, lower riser column stub 930 incorporates inner lower riser column stub surface 933 having lower riser column stub ribs 934. Lower riser column stub ribs 934 incorporate lower riser column stub slots 936. Lower riser column stub slots 936 are adapted to engage lower tabs 141 in lower clip 140 (which is incorporated into base 110), in the same manner as lower tabs 141 engage lower slots 125 in trophy assembly 100, as has been previously described. This enables riser 920 to be assembled with base 110 (or if preferred 110') in the same manner as column 120 is assembled with base 110/110'. Lower riser column stub 930 may also include lower riser trim 935, which is adapted such that it contacts (or nearly contacts) base 110 upon assembly of riser 920 with base 110, thereby giving a finished appearance to the resulting assembly.

Similarly, upper riser column stub 940 incorporates inner upper riser column stub surface 943 having upper riser column stub ribs 944. Upper riser column stub ribs 944 incorporate upper riser column stub slots 946. Upper riser column stub slots 946 are adapted to engage upper tabs 161 or 171 in upper clips 160 or 170, which are incorporated into figure 150/150', in the same manner as upper tabs 161 and 171 engage upper slots 126 in trophy assembly 100, as has been previously described. This enables trophy assembly 900 to be completed by assembling figure 150 to upper riser column stub 940 by placing figure 150 over upper riser column stub 940 and rotating. The result is a completed trophy assembly comprising base 110, riser 900, and figure 150.

It will also be understood that riser 900 may be utilized assemblies (not illustrated) incorporating bases designed for use with threaded trophy assemblies (such as base 510) and figures designed for use with threaded trophy assemblies (such as figure 550) as well. To do this, lower lid 515 may be attached to base 510 (as previously described), lower riser column stub 930 may be placed into lower lid 515, and riser 920 may be rotated, thereby attaching riser 920 to lower lid 515 (and in turn base 510) as was previously described. Then figure 550 may be attached to upper lid 555 (as was previously described), whereupon upper lid 555 may be placed over upper riser column stub 940, and rotated. This completes the trophy assembly (not illustrated).

While the foregoing describes preferred embodiments of the trophy assemblies and components of this invention, it is to be understood that this description is to be considered only as illustrative of the principles of the invention and is not to be limitative thereof, as numerous other variations, all within the scope of the invention, will readily occur to others.

I claim:

1. A trophy assembly comprising a base, a hollow, tubular column, and a lower clip integral to said base wherein
   said column has a first column end and an opposed second column end;
   said column has an interior column surface having a plurality of inwardly and longitudinally extending ribs affixed to said interior column surface and being configured and dimensioned to fit over said lower clip;
   said lower clip comprises at least two lower tabs, at least one lower stop, and at least one lower spring clip;
   two of said ribs each have a lower slot that is generally proximal said first column end, said lower slots being configured and dimensioned such that said lower tabs engage said lower slots when said first column end is placed over said lower clip and rotated;
   said lower stop is configured and dimensioned to engage at least one of said ribs substantially upon said lower tabs engaging said lower slots; and
   said lower spring clip is configured and dimensioned such that, upon rotation of said column, said lower spring clip is deflected by one of said ribs, is released substantially upon said lower tabs engaging said lower slots, and resists reverse rotation upon said release;
   whereby said base and said column are joined, said lower stop resists over-rotation and said lower spring clip resists reverse rotation.

2. A trophy assembly as in claim 1 wherein
   said interior column surface comprises four of said ribs;
   said lower clip comprises four lower tabs, each said lower tab comprising a lower stop;
   said lower clip comprises two lower spring clips;

said ribs each comprise a lower slot generally proximal to said first column end, said lower slots being positioned and dimensioned such that said lower tabs engage said lower slots when said first column end is placed over said lower clip and rotated;

said lower stops are configured and dimensioned to engage said ribs substantially upon said lower tabs engaging said lower slots; and said lower spring clips are configured and dimensioned such that, upon rotation of said column, said lower spring clips are deflected by two of said ribs, are released substantially upon said lower tabs engaging said lower slots, and resist reverse rotation upon said release, whereby said base and said column are joined, said lower stops resist over-rotation and said lower spring clips resist reverse rotation.

3. A trophy assembly as in claim 2 wherein said base has a top base side and a bottom base side;

said lower clip is integral to said top base side;

said bottom base side comprises two base release slots configured and dimensioned such that substantially upon insertion of a release tool comprising two prongs into said base release slots, and rotating said release tool, said prongs deflect said lower spring clips whereby said column may be released from said base by inserting said release tool, rotating said release tool, and counter rotating said column substantially until said lower tabs exit said lower slots.

4. A trophy assembly as in claim 1 further comprising a figure wherein said figure has an integral upper clip; and said upper clip is configured and dimensioned to engage at least one of said ribs when said figure is placed over said second column end and rotated;

whereby said column and said figure are joined.

5. A trophy assembly as in claim 4 wherein said upper clip comprises at least two upper tabs, at least one upper stop, and at least one upper spring clip;

at least two of said ribs each have an upper slot generally proximal to said second column end, said upper slots being positioned and dimensioned such that said upper tabs engage said upper slots when said figure is placed over said second column end and rotated;

said upper stop is configured and dimensioned to engage at least one of said ribs substantially upon said upper tabs engaging said upper slots; and said upper spring clip is configured and dimensioned such that, upon rotation of said figure, said upper spring clip is deflected by one of said ribs, is released substantially upon said upper tabs engaging said upper slots, and resists reverse rotation upon said release;

whereby said column and said figure are joined, said upper stop resists over-rotation of said figure and said upper spring clip resists reverse rotation of said figure.

6. A trophy assembly as in claim 4 wherein said interior column surface comprises four of said ribs;

said upper clip comprises at least two upper tabs and at least two upper deflectors;

two of said ribs each have an upper slot generally proximal to said second column end and positioned and dimensioned such that two of said upper tabs engage said upper slots when said figure is placed over said second column end and rotated; and at least two of said upper deflectors comprise a deflection surface and a recessed cavity, said deflection surface and said recessed cavity being dimensioned and positioned such that said deflection surface engages said rib such that, upon rotation, said deflection surface deflects said column substantially until such time as said rib passes said deflection surface, substantially upon which said rib is captured by said recessed cavity, whereby said column and said figure are joined, and said recessed cavity resists rotation of said figure.

7. A trophy assembly as in claim 1 further comprising an upper lid and a figure wherein said figure is attached to said upper lid;

said upper lid comprises an upper clip integral to said upper lid;

said upper clip comprises at least two upper tabs, at least one upper stop, and at least one upper spring clip;

at least two of said ribs each have an upper slot generally proximal to said second column end, said upper slots being positioned and dimensioned such that at least two of said upper tabs engage said upper slots when said upper lid is placed over said second column end and rotated;

said upper stop is configured and dimensioned to engage at least one of said ribs substantially upon said upper tabs engaging said upper slots; and said upper spring clip is configured and dimensioned such that, upon rotation of said upper lid, said upper spring clip is deflected by one of said ribs, is released substantially upon said upper tabs engaging said upper slots, and resists reverse rotation upon said release;

whereby said column, said upper lid and said figure are joined.

8. A trophy assembly as in claim 1 further comprising an upper lid and a figure wherein said figure is attached to said upper lid;

said interior column surface comprises four of said ribs;

said upper lid comprises an upper clip integral to said upper lid;

said upper clip comprises at least two upper tabs and at least one upper deflector;

at least two of said ribs each have an upper slot generally proximal to said second column end, said upper slots being positioned and dimensioned such that said upper tabs engage said upper slots when said figure is placed over said second column end and rotated;

said upper deflector comprises a deflection surface and a recessed cavity, said deflection surface and recessed cavity being dimensioned and positioned such that said deflection surface engages said rib such that, upon rotation, said deflection surface deflects said column substantially until such time as said rib passes said deflection surface, substantially upon which said rib is captured by said recessed cavity;

whereby said column, said upper lid, and said figure are joined, and said recessed cavity resists rotation of said figure.

9. A trophy assembly as in claim 1 further comprising a platform having an integral upper clip wherein said upper clip comprises at least two upper tabs; and at least two of said ribs each have an upper slot generally proximal to said second column end, said upper slots being positioned and dimensioned such that said upper tabs engage said upper slots when said platform is placed over said second column end and said column is rotated;

whereby said column and said base, and said platform are joined.

10. A trophy assembly as in claim 9 further comprising an upper column wherein said platform further comprises a platform top clip;
- said upper column has a first upper column end and an interior upper column surface comprising a plurality of inwardly and longitudinally extending upper column ribs;
- said upper column is configured and dimensioned to fit over said platform top clip; and
- said platform top clip is configured and dimensioned to engage at least one of said upper column ribs when said first upper column end is placed over said platform top clip and said upper column is rotated;
- whereby said platform and said upper column are joined.

11. A trophy assembly comprising a base, a lower lid, and a hollow, tubular column, wherein
- said lower lid is attached to said base and comprises a lower clip integral to said lid;
- said column has a first column end and an opposed second column end;
- said column has an interior column surface having a plurality of inwardly and longitudinally extending ribs affixed to said interior column surface, said interior column surface being configured and dimensioned to fit over said lower clip;
- said lower clip comprises at least two lower tabs, at least one lower stop, and at least one lower spring clip;
- two of said ribs each have a lower slot generally proximal said first column end and configured and dimensioned such that said lower tabs engage said lower slots when said first column end is placed over said lower clip and rotated;
- said lower stop is configured and dimensioned to engage at least one of said ribs substantially upon said lower tabs engaging said lower slots; and
- said lower spring clip is configured and dimensioned such that, upon rotation of said column, said lower spring clip is deflected by one of said ribs, is released substantially upon said lower tabs engaging said lower slots, and resists reverse rotation upon said release;
- whereby said base and said column are joined, said lower stop resists over-rotation and said lower spring clip resists reverse rotation.

12. A trophy assembly as in claim 11 wherein
- said interior column surface comprises four of said ribs,
- said lower clip comprises four lower tabs, each said lower tab comprising a lower stop,
- said lower clip comprises at least one lower spring clip;
- said ribs each comprise a lower slot generally proximal to said first column end and positioned and dimensioned such that said lower tabs engage said lower slots when said first column end is placed over said lower clip and rotated;
- said lower stops are configured and dimensioned to engage said ribs substantially upon said lower tabs engaging said lower slots; and
- said lower spring clip is configured and dimensioned such that upon rotation of said column said lower spring clip is deflected by two of said ribs, is released substantially upon said lower tabs engaging said lower slots, and resists reverse rotation upon said release,
- whereby said base, said lower lid, and said column are joined, said lower stops resist over-rotation and said lower spring clip resists reverse rotation.

13. A trophy assembly as in claim 11 further comprising an upper lid and a figure wherein
- said figure is attached to said upper lid;
- said upper lid comprises an upper clip integral to said upper lid;
- said upper clip comprises at least two upper tabs, at least one upper stop, and at least one upper spring clip;
- at least two of said ribs each have an upper slot generally proximal to said second column end, said upper slots being positioned and dimensioned such that said upper tabs engage said upper slots when said upper lid is placed over said second column end and rotated;
- said upper stop is configured and dimensioned to engage at least one of said ribs substantially upon said upper tabs engaging said upper slots; and
- said upper spring clip is configured and dimensioned such that, upon rotation of said upper lid, said upper spring clip is deflected by one of said ribs, is released substantially upon said upper tabs engaging said upper slots, and resists reverse rotation upon said release;
- whereby said column, said upper lid and said figure are joined.

14. A trophy assembly as in claim 11 further comprising an upper lid and a figure wherein
- said figure is attached to said upper lid;
- said upper lid comprises an upper clip integral to said upper lid;
- said interior column surface comprises four of said ribs;
- said upper clip comprises two upper tabs and at least one upper deflector;
- at least two of said ribs each have an upper slot generally proximal to said second column end and positioned and dimensioned such that said upper tabs engage said upper slots when said figure is placed over said second column end and rotated;
- said upper deflector comprises a deflection surface and a recessed cavity,
- said deflection surface and recessed cavity being dimensioned and positioned such that said deflection surface engages said rib such that, upon rotation, said deflection surface deflects said column substantially until such time as said rib passes said deflection surface, substantially upon which said rib is captured by said recessed cavity
- whereby said column, said upper lid, and said figure are joined, and said recessed cavity resists rotation of said figure.

15. A trophy assembly as in claim 11 further comprising an upper lid and a platform wherein
- said platform is attached to said upper lid;
- said upper lid comprises an upper clip integral to said upper lid;
- said upper clip comprises at least two upper tabs; and
- at least two of said ribs each have an upper slot generally proximal to said second column end and positioned and dimensioned such that said upper tabs engage said upper slots when said platform is placed over said second column end and said column is rotated;
- whereby said base, said lower lid, said column, said upper lid, and said platform are joined.

16. A trophy assembly as in claim 15 further comprising a platform lid and an upper column wherein
- said platform lid is attached to said platform;
- said platform lid further comprises a platform lid lower clip;
- said upper column has a first upper column end and an interior upper column surface comprising a plurality of inwardly and longitudinally extending upper column ribs;

said upper column is configured and dimensioned to fit over said platform lid lower clip; and said platform lid lower clip is configured and dimensioned to engage at least one of said upper column ribs when said first upper column end is placed over said platform lid lower clip and said upper column is rotated;

whereby said platform, said upper lid, and said upper column are joined.

17. A plastic base for use in a trophy assembly, said trophy assembly comprising a hollow, tubular column having a first column end and an opposed second column end, and an interior column surface having a plurality of inwardly and longitudinally extending ribs affixed to said interior column surface, said ribs each having a lower slot generally proximal said first column end; wherein said base comprises a lower clip, said lower clip comprises at least two lower tabs, at least one lower stop, and at least one lower spring clip;

said lower tabs are configured and dimensioned such that said lower tabs engage said lower slots when said first column end is placed over said lower clip and rotated;

said lower stop is configured and dimensioned to engage at least one of said ribs substantially upon said lower tabs engaging said lower slots; and said lower spring clip is configured and dimensioned such that, upon rotation of said column, said lower spring clip is deflected by one of said ribs, is released substantially upon said lower tabs engaging said lower slots, and resists reverse rotation upon said release;

whereby said base and said column are joined, said lower stop resists over-rotation and said lower spring clip resists reverse rotation.

18. A plastic base for use in a trophy assembly as in claim 17 wherein said lower clip comprises four lower tabs, each said lower tab comprising a lower stop, said lower clip comprises two lower spring clips;

said base has a top base side and an opposing bottom base side;

said lower clip is integral to said top base side;

said bottom base side comprises two base release slots substantially opposite said lower spring clips, said base release slots being configured and dimensioned such that substantially upon insertion of a release tool comprising two prongs into said base release slots, and rotating said release tool, said prongs deflect said lower spring clips whereby said column may be released from said base by inserting said release tool, rotating said release tool, and counter rotating said column substantially until said lower tabs exit said lower slots.

* * * * *